United States Patent
Brice, Jr. et al.

(10) Patent No.: US 7,277,968 B2
(45) Date of Patent: Oct. 2, 2007

(54) MANAGING SETS OF INPUT/OUTPUT COMMUNICATIONS SUBADAPTERS OF AN INPUT/OUTPUT SUBSYSTEM

(75) Inventors: Frank W. Brice, Jr., Hurley, NY (US); Janet R. Easton, Woodstock, NY (US); Charles W. Gainey, Jr., Poughkeepsie, NY (US); Jeffrey P. Kubala, Poughquag, NY (US); Hans-Helge Lehmann, Weil im Schoenbuch (DE); Tan Lu, Poughkeepsie, NY (US); Ugochukwu Njoku-Charles, Bronx, NY (US); Kenneth J. Oakes, Wappingers Falls, NY (US); Dale F. Riedy, Jr., Poughkeepsie, NY (US); Charles E. Shapley, Salt Point, NY (US); Gustav E. Sittmann, Webster Groves, MO (US); Leslie W. Wyman, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/764,421

(22) Filed: Jan. 23, 2004

(65) Prior Publication Data

US 2005/0165969 A1     Jul. 28, 2005

(51) Int. Cl.
*G06F 3/00* (2006.01)

(52) U.S. Cl. .......................................... 710/36; 710/38
(58) Field of Classification Search ...................... None
See application file for complete search history.

(56) References Cited

U.S. PATENT DOCUMENTS

| | | | |
|---|---|---|---|
| 3,693,161 A | 9/1972 | Price et al. | 340/172.5 |
| 4,207,609 A | 6/1980 | Luiz et al. | 364/200 |
| 4,564,903 A | 1/1986 | Guyette et al. | 364/300 |
| 4,843,541 A | 6/1989 | Bean et al. | 364/200 |
| 5,170,472 A | 12/1992 | Cwiakala et al. | 395/275 |
| 5,185,736 A | 2/1993 | Tyrrell et al. | 370/55 |
| 5,297,262 A | 3/1994 | Cox et al. | 395/325 |
| 5,317,739 A | 5/1994 | Elko et al. | 395/650 |
| 5,414,851 A | 5/1995 | Brice, Jr. et al. | 395/650 |

(Continued)

OTHER PUBLICATIONS

U.S. Appl. No. 10/436,021, Brice et al., "Multiple Logical Input/Output Subsystem Facility," filed May 12, 2003.

(Continued)

*Primary Examiner*—Donald Sparks
*Assistant Examiner*—David E. Martinez
(74) *Attorney, Agent, or Firm*—Eugene I. Shkurko, Esq.; Blanch E. Schiller, Esq.; Heslin Rothenberg Farley & Mesiti P.C.

(57) ABSTRACT

Input/output (I/O) communications subadapters, such as subchannels, of an I/O subsystem are dedicated to components, such as I/O devices, of the I/O subsystem. The subadapters provide information about the associated components, in response to the execution of I/O instructions. To enhance I/O connectivity, a plurality of sets of I/O subadapters is provided to an operating system image. This allows programs of the operating system image to access a same component via different sets of I/O communications subadapters. Further, it enables an operating system image to use more than 64 k subchannels.

37 Claims, 10 Drawing Sheets

U.S. PATENT DOCUMENTS

| | | | |
|---|---|---|---|
| 5,452,455 A | 9/1995 | Brown et al. ................ 395/700 |
| 5,526,484 A | 6/1996 | Casper et al. .......... 396/200.14 |
| 5,537,574 A | 7/1996 | Elko et al. ................... 396/468 |
| 5,548,791 A | 8/1996 | Casper et al. ............... 395/858 |
| 5,564,040 A | 10/1996 | Coscarella et al. .......... 395/862 |
| 5,568,648 A * | 10/1996 | Coscarella et al. ............ 710/42 |
| 5,584,039 A | 12/1996 | Johnson et al. .............. 395/826 |
| 5,600,805 A | 2/1997 | Fredericks et al. ......... 395/825 |
| 5,640,603 A | 6/1997 | Meritt et al. ................. 395/858 |
| 5,644,712 A | 7/1997 | Coscarella et al. .... 395/200.01 |
| 5,680,580 A | 10/1997 | Beardsley et al. .......... 395/489 |
| 5,793,983 A | 8/1998 | Albert et al. .......... 395/200.96 |
| 5,845,146 A | 12/1998 | Onondera .................... 395/822 |
| 5,907,684 A | 5/1999 | Halma et al. .......... 395/200.67 |
| 5,996,026 A | 11/1999 | Onondera et al. .............. 710/3 |
| 6,125,411 A | 9/2000 | Sato ............................ 710/38 |
| 6,167,459 A | 12/2000 | Beardsley et al. .............. 710/3 |
| 6,170,023 B1 | 1/2001 | Beardsley et al. ............ 710/36 |
| 6,185,638 B1 | 2/2001 | Beardsley et al. ............ 710/36 |
| 6,188,702 B1 | 2/2001 | Tornetta et al. ............. 370/535 |
| 6,195,330 B1 | 2/2001 | Sawey et al. ................ 370/220 |
| 6,240,467 B1 | 5/2001 | Beardsley et al. ............. 710/5 |
| 6,397,260 B1 | 5/2002 | Wils et al. ................... 709/238 |
| 6,519,660 B1 * | 2/2003 | Rooney ........................ 710/38 |
| 7,051,188 B1 * | 5/2006 | Kubala et al. ................ 712/29 |
| 7,085,860 B2 | 8/2006 | Dugan et al. ................. 710/36 |
| 2003/0103504 A1 | 6/2003 | Dugan et al. ................ 370/392 |
| 2004/0083356 A1 | 4/2004 | Chatterjee et al. ............. 713/1 |
| 2004/0230783 A1 * | 11/2004 | Brice et al. .................... 713/1 |

OTHER PUBLICATIONS

U.S. Appl. No. 10/435,955, Brice et al. "Sharing Communications Adaptors Across A Plurality Of Input/Output Subsystem Images," filed May 12, 2003.

"z/Architecture—Principles of Operation," SA22-7832-01, International Business Machines Corporation, Second Edition, Oct. 2001.

"z/Series—Input/Output Configuration Program Users's Guide for IYP IOCP," SB10-7029-03, International Business Machines, Fourth Edition, Aug. 2002, Chapter 2.

* cited by examiner

REQUEST BLOCK FOR SET DOMAIN ATTRIBUTES

MANAGING SETS OF INPUT/OUTPUT COMMUNICATIONS SUBADAPTERS OF AN INPUT/OUTPUT SUBSYSTEM

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"MULTIPLE LOGICAL INPUT/OUTPUT SUBSYSTEM FACILITY," Brice et al., Ser. No. 10/436,021, filed May 12, 2003;

"MANAGING INPUT/OUTPUT SUBSYSTEM IMAGES OF AN INPUT/OUTPUT SUBSYSTEM," Brice et al., Ser. No. 10/435,773, filed May 12, 2003;

"METHOD, SYSTEM AND PROGRAM PRODUCTS FOR ENHANCING INPUT/OUTPUT PROCESSING FOR OPERATING SYSTEM IMAGES OF A COMPUTING ENVIRONMENT," Brice et al., Ser. No. 10/435,975, filed May 12, 2003;

"METHOD, SYSTEM AND PROGRAM PRODUCTS FOR IDENTIFYING COMMUNICATIONS ADAPTERS OF A COMPUTING ENVIRONMENT," Brice et al., Ser. No. 10/436,385, filed May 12, 2003;

"MANAGING ACCESS, BY OPERATING SYSTEM IMAGES OF A COMPUTING ENVIRONMENT, OF INPUT/OUTPUT RESOURCES OF THE COMPUTING ENVIRONMENT," Brice et al., Ser. No. 10/436,240, filed May 12, 2003; and "SHARING COMMUNICATIONS ADAPTERS ACROSS A PLURALITY OF INPUT/OUTPUT SUBSYSTEM IMAGES," Brice et al., Ser. No. 10/435,955, filed May 12, 2003.

TECHNICAL FIELD

This invention relates, in general, to input/output (I/O) processing, and in particular, to extending the functionality of input/output subsystems used in I/O processing.

BACKGROUND OF THE INVENTION

Input/output processing is often the responsibility of an I/O subsystem of a communications environment. An I/O subsystem relieves the central processors of the communications environment of the task of communicating directly with the input/output devices of the environment and permits data processing to proceed concurrently with input/output processing.

The I/O subsystem employs various components, including I/O communications adapters and I/O communications subadapters. The I/O communications adapters are used in providing paths to the I/O devices, while the I/O communications subadapters are used to provide information concerning the I/O devices associated with the subadapters. There are many types of communications adapters and subadapters. In systems, such as the eServer zSeries and ESA/390 systems, offered by International Business Machines Corporation, Armonk, N.Y., an example of a communications adapter is a channel, and an example of a communications subadapter is a subchannel.

A subchannel provides the logical appearance of an I/O device to a program and includes the controls required by both the operating system and the I/O subsystem for sustaining a sequential stream of I/O operations directed against the associated device. In the current zSeries servers, a system footprint, referred to as a central processing complex (CPC), is limited to a maximum of 65,536 (64 k) subchannels per operating system image. As the zSeries processor core becomes more powerful over time and as the number of processors per CPC increases, operating systems are driving more and more workload in order to take advantage of the added processing capacity. As the workload of each operating system image increases, so does the need for I/O access. Thus, the 64 k maximum subchannel limit is a significant capacity constraint.

Based on the foregoing, a need exists for a facility that enables more than 64 k subchannels per operating system image to be used. In one example, the facility is to provide the additional capacity, while avoiding major programming impacts to existing operating systems. That is, the capability to allow more than 64 k subchannels is to be accomplished in a manner that is transparent to the existing operating system programs that do not take advantage of the increase in I/O connectivity.

SUMMARY OF THE INVENTION

The shortcomings of the prior art are overcome and additional advantages are provided through the provision of a method of enhancing input/output (I/O) connectivity of a communications environment. The method includes, for instance, providing a plurality of sets of I/O communications subadapters to an operating system image of the communications environment, the plurality of sets of I/O communications subadapters providing information to the operating system image relating to a plurality of components associated with the plurality of sets of I/O communications subadapters.

System and computer program products, as well as additional methods, are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a facility is provided in which the maximum number of I/O communications subadapters (e.g., subchannels) available to an operating system image is enhanced. In one example, the subadapters are logically partitioned into one or more sets, and each set includes up to, for instance, 65,536 (64 k) subadapters.

Figure 1A:
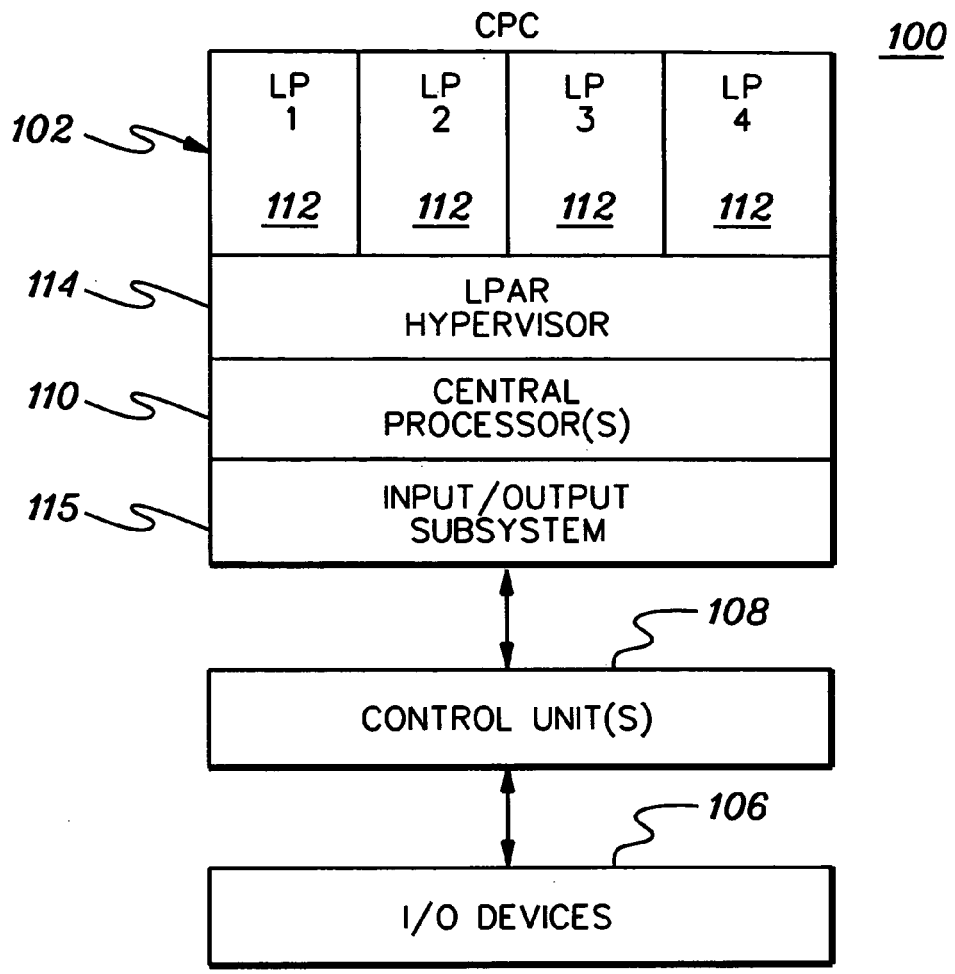
FIG. 1a depicts one embodiment of a communications environment to incorporate and use one or more aspects of the present invention.

One embodiment of a communications environment to incorporate and use one or more aspects of the present invention is described with reference to FIG. 1a. In one example, communications environment 100 is based on the z/Architecture, offered by International Business Machines Corporation, Armonk, N.Y. The z/Architecture is described in an IBM Publication entitled "z/Architecture Principles of Operation," Publication No. SA22-7832-02, June 2003, which is hereby incorporated herein by reference in its entirety.

As one example, communications environment 100 includes a central processor complex (CPC) 102 coupled to one or more input/output (I/O) devices 106 via one or more control units 108. Central processor complex 102 includes, for instance, one or more central processors 110, one or more partitions 112 (e.g., logical partitions (LP) or zones), a logical partition hypervisor 114, and an input/output subsystem 115, each of which is described below.

Central processors 110 are physical processor resources allocated to the logical partitions. In particular, each logical partition 112 has one or more logical processors, each of which represents all or a share of a physical processor 110 allocated to the partition. The physical processors to which the logical processors are dispatched by the hypervisor may be either dedicated to a given partition's logical processors or shared by logical processors configured to multiple sharing logical partitions.

A logical partition functions as a separate system and has one or more applications and a resident operating system therein, which may differ for each logical partition. In one embodiment, the operating system is the z/OS operating system, the z/VM operating system, the z/Linux operating system or the TPF operating system, offered by International Business Machines Corporation, Armonk, N.Y. IBM® is a registered trademark of International Business Machines Corporation, Armonk, N.Y., U.S.A. z/OS, z/VM, z/Linux, TPF and other names used herein may be registered trademarks, trademarks or product names of International Business Machines Corporation or other companies.

Logical partitions 112 are managed by a logical partition hypervisor 114, which is implemented by Licensed Internal Code running on processors 110. The logical partitions and logical partition hypervisor each comprise one or more programs residing in respective partitions of central storage associated with the central processors. One example of logical partition hypervisor 114 is the Processor Resource/System Manager (PR/SM), offered by International Business Machines Corporation, Armonk, N.Y. Further details regarding logical partitions are described in, for instance, Guyette et al., U.S. Pat. No. 4,564,903, entitled "Partitioned Multiprocessor Programming System," issued on Jan. 14, 1986; Bean et al., U.S. Pat. No. 4,843,541, entitled "Logical Resource Partitioning Of A Data Processing System," issued on Jun. 27, 1989; and Kubala, U.S. Pat. No. 5,564,040, entitled "Method And Apparatus For Providing A Server Function In A Logically Partitioned Hardware Machine," issued on Oct. 8, 1996, each of which is hereby incorporated herein by reference in its entirety.

Input/output subsystem 115 directs the flow of information between input/output devices 106 and main storage. It is coupled to the central processing complex, in that it can be a part of the central processing complex or separate therefrom. The I/O subsystem relieves the central processors of the task of communicating directly with the input/output devices and permits data processing to proceed concurrently with input/output processing. To provide communications, the I/O subsystem employs I/O communications adapters. There are various types of communications adapters including, for instance, channels, I/O adapters, PCI cards, Ethernet cards, Small Computer Storage Interface (SCSI) cards, etc. In the particular example described herein, the I/O communications adapters are channels, and therefore, the I/O subsystem is referred to herein as a channel subsystem. However, this is only one example. Other types of I/O subsystems can incorporate and use one or more aspects of the present invention.

Figure 1B:
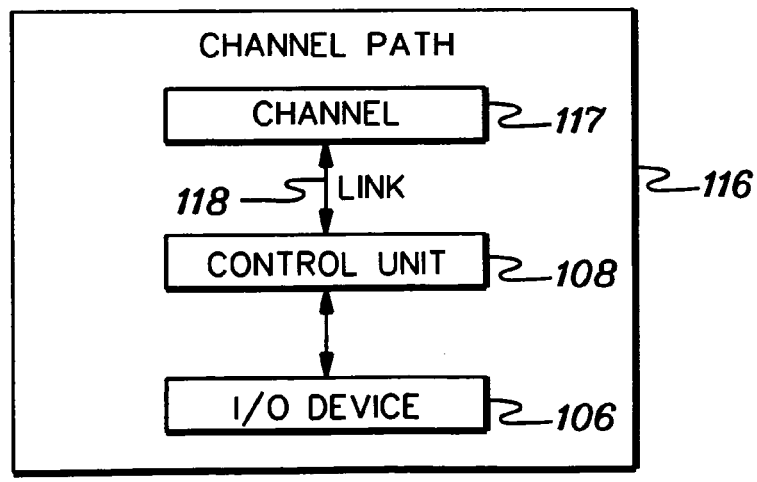
FIG. 1b depicts one example of an I/O path (e.g., a channel path) used for communications in the communications environment of FIG. 1a, in accordance with an aspect of the present invention.

The I/O subsystem uses one or more input/output paths as communication links in managing the flow of information to or from input/output devices 106. In this particular example, these paths are called channel paths, since the communications adapters are channels. Each channel path 116 (FIG. 1b) includes a channel 117 of channel subsystem 115, a control unit 108, a link 118 (e.g., serial or parallel) between the channel and control unit, and one or more I/O devices 106 coupled to the control unit. In other embodiments, channel paths may have multiple control units and/or other components. Further, in another example, it is also possible to have one or more dynamic switches as part of the channel path. A dynamic switch is coupled to a channel and a control unit and provides the capability of physically interconnecting any two links that are attached to the switch. Further details regarding channel subsystems are described in Casper et al., U.S. Pat. No. 5,526,484, entitled, "Method And System For Pipelining The Processing Of Channel Command Words," issued on Jun. 11, 1996, which is hereby incorporated herein by reference in its entirety.

A control unit may be accessible by the channel subsystem by more than one channel path. Similarly, an I/O device may be accessible by the channel subsystem through more than one control unit, each having one or more channel paths to the channel subsystem. The control unit accepts control signals from the channel subsystem, controls the timing of data transfer over the channel path, and provides indications concerning the status of the device. The control unit may be housed separately or it may be physically and logically integrated with the I/O device, the channel subsystem, or a central processor.

The I/O device (or other component) attached to the control unit may be designed to perform certain limited operations, or it may perform many different operations. To accomplish its operations, the device uses detailed signal sequences peculiar to its type of device. The control unit decodes the commands received from the channel subsystem, interprets them for the particular type of device, and provides the signal sequence required for the performance of the operation.

In addition to one or more channels, a channel subsystem includes one or more subchannels, which are examples of subadapters. Each subchannel is provided for and dedicated to a component, such as an I/O device (or a group of components, such as a group of I/O devices), coupled to the program (e.g., operating system) through the channel subsystem. Each subchannel provides information concerning the associated I/O device or group of I/O devices, and its attachment to the channel subsystem. The subchannel also provides information concerning I/O operations and functions involving the associated I/O device or group of I/O devices. The subchannel provides a logical appearance of a device or group of devices to the program and is the means by which the channel subsystem provides information about associated I/O devices to the central processors, which obtain this information by executing I/O instructions. The subchannel has internal storage that includes information in the form of a channel command word (CCW) address, a channel path identifier, device number, count, status indication and I/O interruption subclass code, as well as information on path availability and functions pending or being performed. I/O operations are initiated with a device by the execution of I/O instructions that designate the subchannel associated with the device or devices.

Figure 1C:
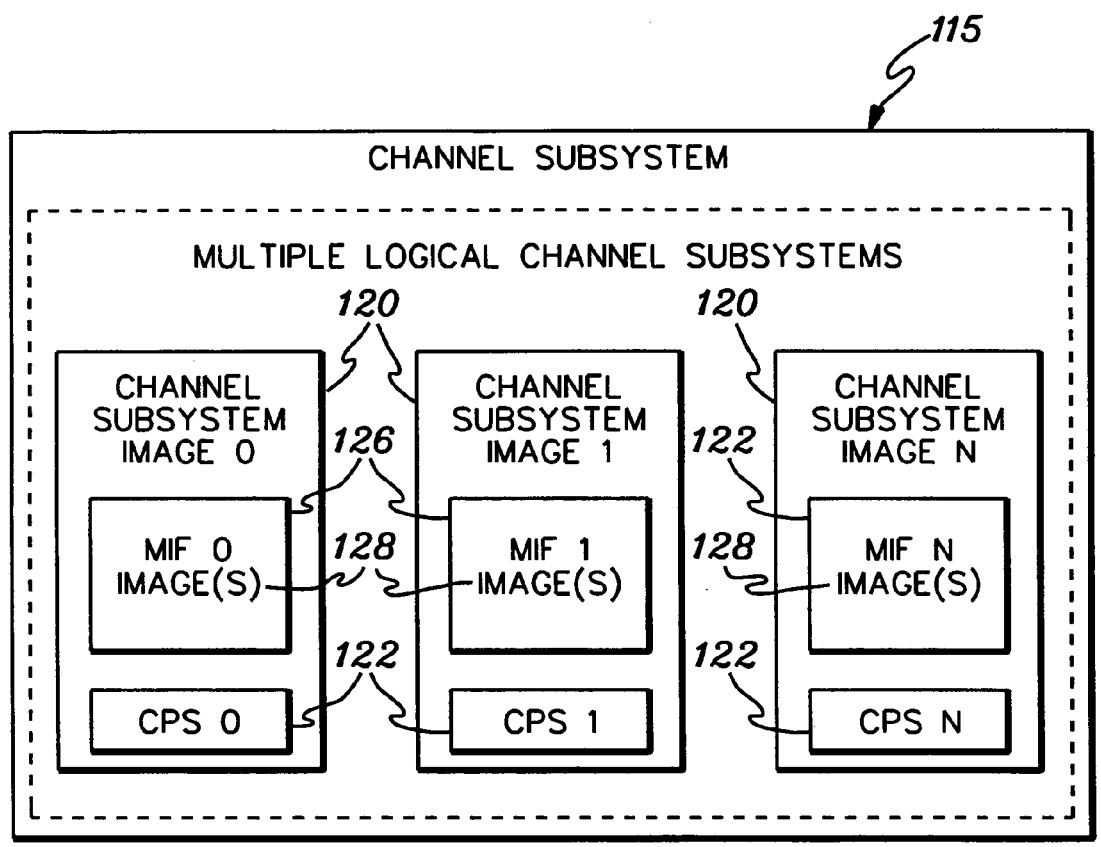
FIG. 1c depicts one embodiment of an example of an I/O subsystem (e.g., a channel subsystem) of FIG. 1a being configured as a plurality of I/O subsystem (e.g., channel subsystem) images, in accordance with an aspect of the present invention.

Further details regarding a channel subsystem are described with reference to FIG. 1c. A channel subsystem 115 (or other I/O subsystem) is configured as a plurality of channel subsystem images 120 (or other I/O subsystem images), each identified by a channel subsystem image identifier (CSSID) (or other I/O subsystem identifier). In one example, the channel subsystem is configured, either by model dependent means, in which configuration controls are used during initialization, or by use of appropriate dynamic I/O configuration commands, as one to 256 channel subsystem images. Each channel subsystem image appears to a program as a complete channel subsystem. Each channel subsystem image may have, for instance, from 1 to 256 unique channel paths, thereby increasing the maximum number of channel paths that may be configured to the channel subsystem from 256 to 65,536. The configuring of the channel subsystem as a plurality of channel subsystem images is facilitated by a Multiple Channel Subsystem facility (MCSS), one embodiment of which is described in a U.S. patent application entitled "Multiple Logical Input/Output Subsystem Facility," Brice, Jr. et al., Ser. No. 10/436,021, filed May 12, 2003, which is hereby incorporated herein by reference in its entirety.

Figure 1D:
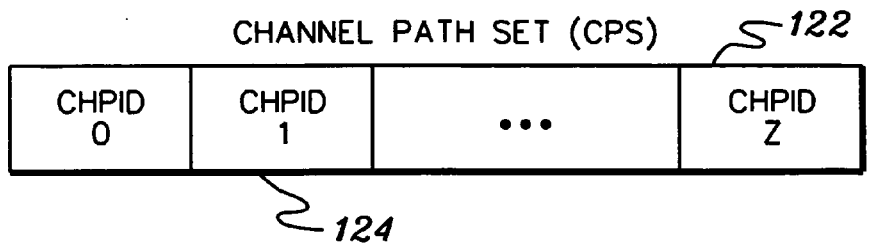
FIG. 1d depicts further details of a channel path set (CPS) of a channel subsystem image of FIG. 1c, in accordance with an aspect of the present invention.

A channel subsystem image 120 includes, for instance, a channel path set 122 identifying the channel paths associated with a channel subsystem image. Each channel path is identified by a CHPID 124, as depicted in FIG. 1d. Channel subsystem image 120 (FIG. 1c) further includes, in this example, a Multiple Image Facility (MIF) 126. Multiple Image Facility 126 includes one or more (e.g., up to 16) MIF images 128, each identified by a MIF image identifier (IID). The Multiple Image Facility allows each logical partition to achieve independent access to the channel paths, control units and I/O devices that are configured to and dynamically shared by multiple logical partitions.

Figure 1F:
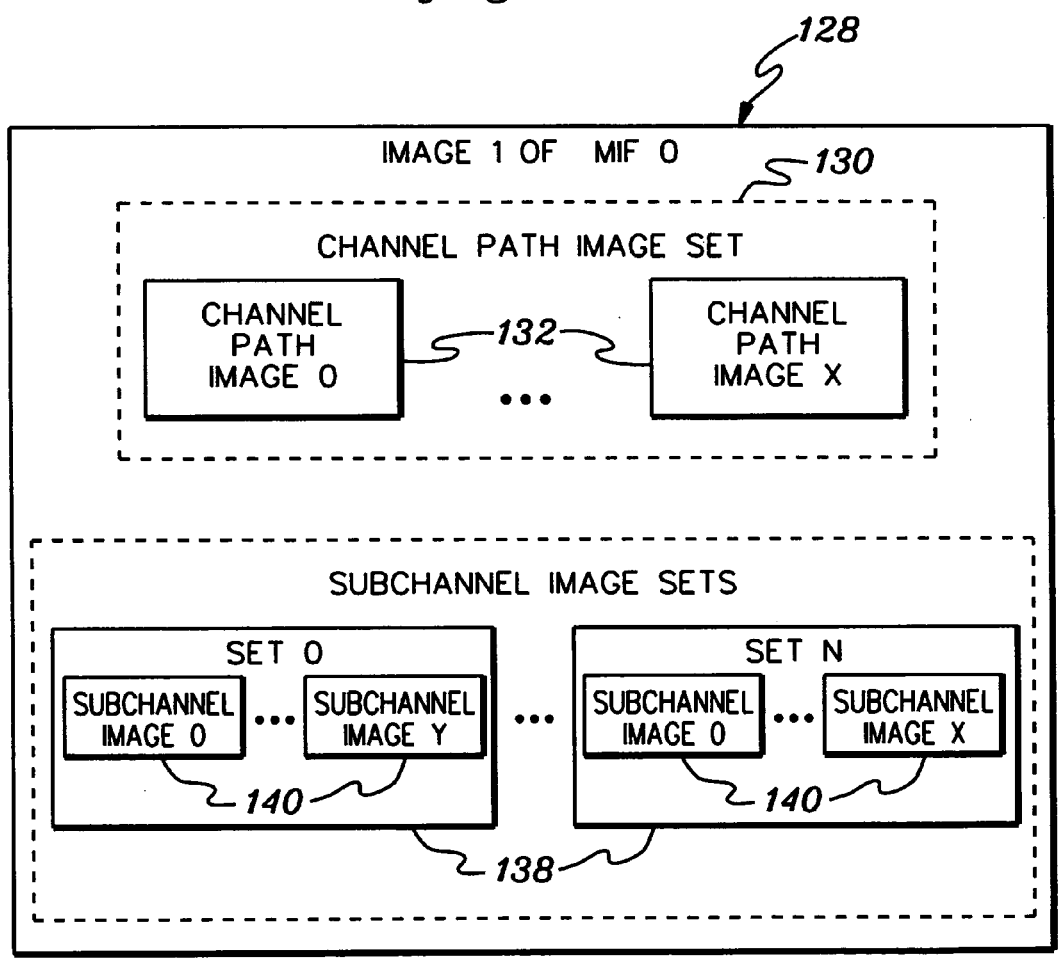
FIG. 1f depicts further details of a Multiple Image Facility (MIF) image of a channel subsystem image of FIG. 1c, in accordance with an aspect of the present invention.
Figure 1E:
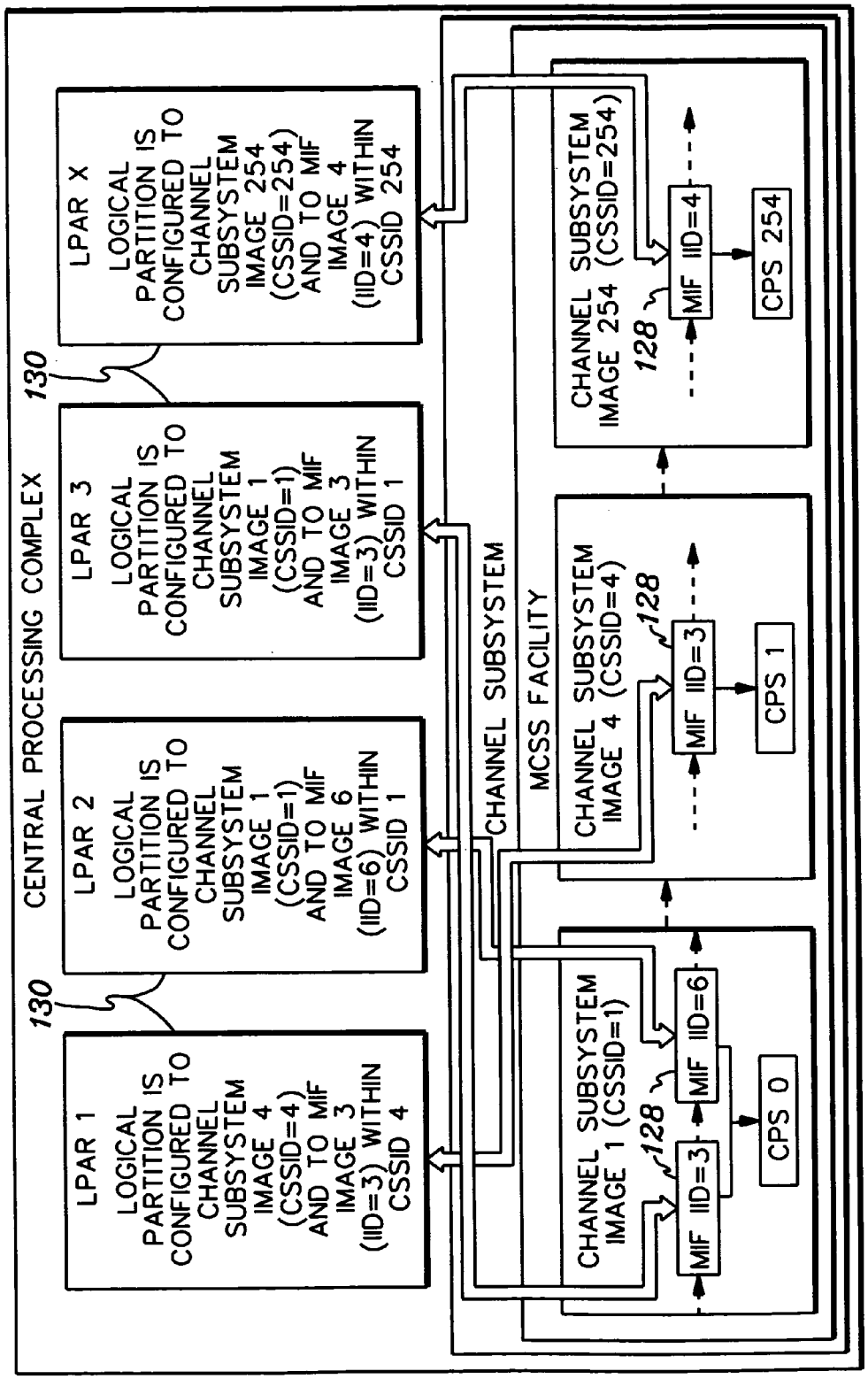
FIG. 1e depicts one embodiment of a plurality of logical partitions coupled to a plurality of channel subsystem images, in accordance with an aspect of the present invention.

As one example, each logical partition 130 (FIG. 1e) is configured to a different MIF image 128 in order to provide the logical partition with an independent set of controls for channel paths, control units and devices that are shared by other logical partitions. Various details regarding the Multiple Image Facility are described in Brice, Jr. et al., U.S. Pat. No. 5,414,851, entitled "Method And Means For Sharing I/O Resources By A Plurality Of Operating Systems," issued on May 9, 1995, which is hereby incorporated herein by reference in its entirety.

Each MIF image includes, for instance, a separate set of channel path controls, referred to as a channel path image set 130 (FIG. 1f) provided by the channel subsystem. Channel path image set 130 includes one or more channel path images 132 that are associated with the channel paths configured to the MIF image. For instance, each image 132 includes one or more channel path controls for a configured channel path of the MIF image.

In addition to a channel path image set, each MIF image includes a subchannel image set 138 provided by the channel subsystem. A subchannel image set includes one or more subchannel images (a.k.a., subchannels) 140 and each subchannel image corresponds to an I/O device or group of I/O devices configured to the MIF image. Further, in accordance with an aspect of the present invention, a MIF image may include a plurality of subchannel image sets 138, each set including one or more subchannel images. That is, the operating system image associated with a MIF image may gain authorization to access a plurality of subchannel image sets 138 for that MIF image. Thus, an operating system associated with a MIF image and authorized to access a plurality of subchannel set images included in that MIF image has access to up to 65,536 subchannel images per subchannel set image. The facility that enables the use of multiple subchannel sets is referred to herein as the Multiple Subchannel Set (MSS) facility.

To gain authorization to multiple subchannel image sets, the operating system image issues a command, referred to herein as the Set Domain Attributes (SDA) command, which is implemented using a Channel Subsystem Call (CHSC) instruction, in this example. The Set Domain Attributes command is used to convey information from a program (e.g., an operating system) to a channel subsystem. The scope of a domain is specifically stated for each individual operation that is defined. The operation code is used to specify the particular operation and associated data, when applicable to that operation. The domain for this operation encompasses the logical partition and all current and future channel subsystem images associated with the logical partition. In one example, the Set Domain Attributes command is executed synchronously and is not interpretively executed.

Figure 2A:
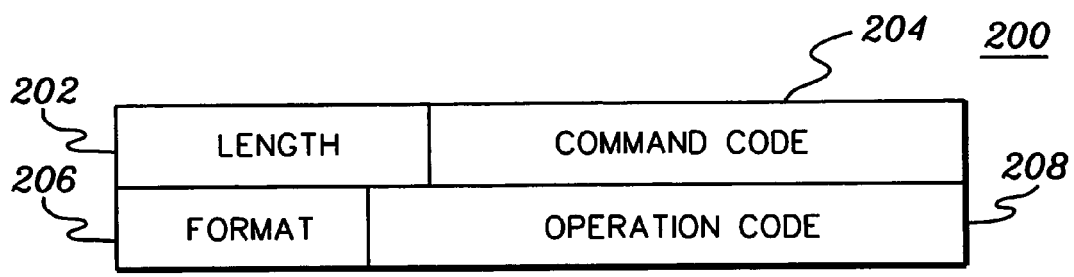
FIG. 2a depicts one embodiment of a request block for a Set Domain Attributes command used in accordance with an aspect of the present invention.

One example of a command request block for the Set Domain Attributes command is described with reference to FIG. 2a. In one example, a request block 200 for a Set Domain Attributes command includes the following:

(a) Length Field 202: This field specifies the length of a command request block.

(b) Command Code 204: This field specifies the Set Domain Attributes command.

(c) Format (FMT) 206: The command request format field includes an unsigned integer whose value specifies the layout of the command request block.

(d) Operation Code (OC) 208: This field includes a value that specifies the operation that is to be performed. In one example, an operation code of two enables the Multiple Subchannel Set (MSS) facility.

Figure 2B:
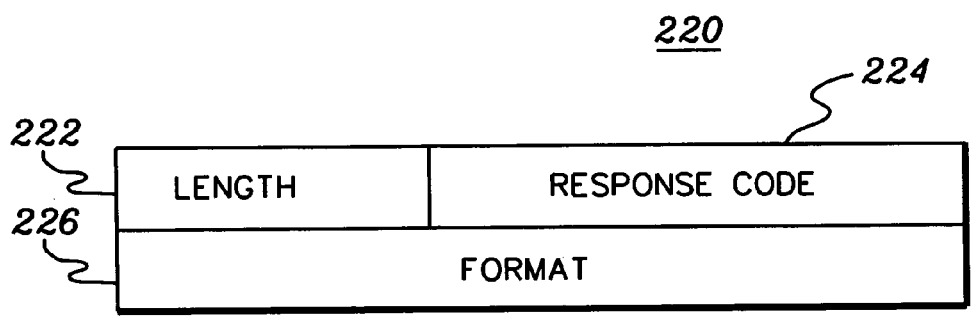
FIG. 2b depicts one embodiment of a response block for the Set Domain Attributes command used in accordance with an aspect of the present invention.

One embodiment of a command response block for the Set Domain Attributes command is described with reference to FIG. 2b. In one example, a command response block 220 for the Set Domain Attributes command includes the following fields:

(a) Length Field 222: This field specifies the length of the command response block.

(b) Response code 224: This field includes an unsigned integer that describes the results of the attempt to execute the Set Domain Attributes command.

(c) Format 226: The command response format field includes an unsigned integer whose value specifies the layout of the command response block.

When the Multiple Subchannel Set facility is provided by the CPC and when the enable MSS operation is executed, the requesting logical partition is permitted to use a plurality of subchannel sets. In one example, subchannel sets having a subchannel set id (SSID) of 0-3 are permitted to be used. A subchannel set having a subchannel set id of 0 is considered the default subchannel set and is used even when MSS is disabled.

Figure 3:
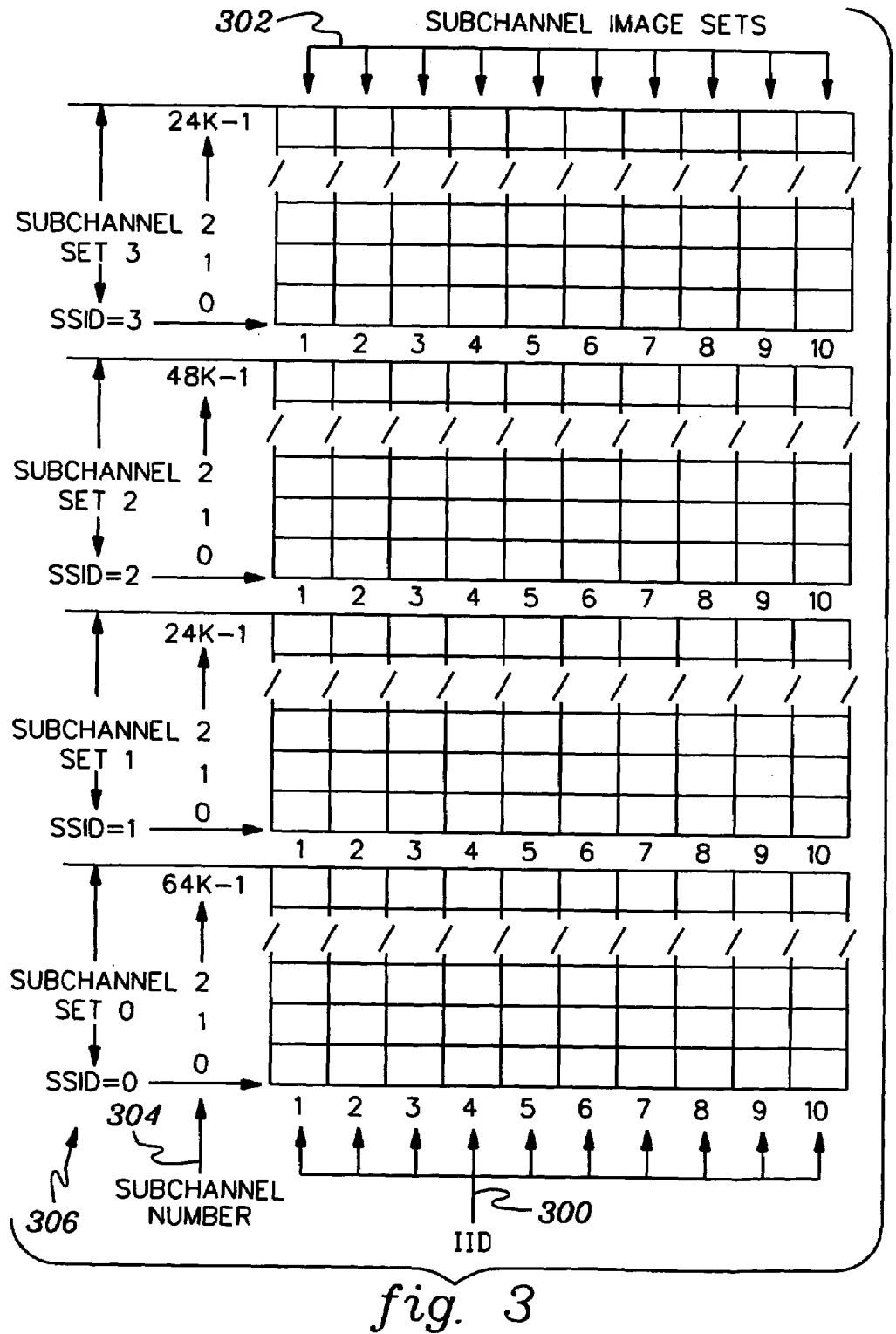
FIG. 3 pictorially depicts a plurality of subchannel image sets for an operating system image, in accordance with an aspect of the present invention.

Further details regarding subchannel image sets are described with reference to FIG. 3. In one embodiment, each MIF image identified by a MIF image id (IID) 300 includes a plurality of (e.g., four) subchannel image sets 302, as depicted by the vertical columns in FIG. 3. Each set includes one or more subchannels 304 (up to, for instance 64 k) for a given MIF image and is identified by a subchannel set identifier (SSID) 306. For example, the subchannel set identified by SSID=0 has up to 64 k subchannels (numbered 0 to 64 k-1) identified for MIF IID 1; up to 64 k subchannels (numbered 0 to 64 k-1) identified for MIF IID 2, etc. Similarly, in this example, the subchannel set identified by SSID=1 has up to 24 k subchannels (numbered 0 to 24 k-1) identified for MIF IID 1; up to 24 k subchannels (numbered 0 to 24 k-1) identified for MIF IID 2, etc; and so on.

Each subchannel image set for each configured MIF image:

may have a different number of configured subchannel images up to the maximum, in this example, of 64 k images.

has unique device numbers assigned to each subchannel image that comprises the subchannel image set.

may contain subchannel images that are configured to devices that are unique to that subchannel image set.

may contain subchannel images for devices that are common to subchannel images in one or more of the other subchannel image sets configured to the same MIF image.

In this case, each of the subchannel images, for the common device, in each of the subchannel image sets may have the same device number assigned to the common device or a unique device number assigned for the common device.

A subchannel image is identified, in one embodiment, by a unique address formed by the concatenation of the following:

1. The channel subsystem image identifier (CSSID) of the channel subsystem image to which to the subchannel image is configured. (This value is provided, when the MCSS facility is provided.);
2. The MIF image identifier (IID) associated with the logical partition for which the subchannel image is being accessed. (This value is provided, when the MIF is provided.);
3. The subchannel set identifier (SSID) of the subchannel set to which the designated subchannel image is configured; and
4. The subchannel number of the subchannel being accessed within the specified subchannel set.

In other embodiments, the Multiple Channel Subsystem (MCSS) facility and/or the Multiple Image Facility (MIF) may not be included or enabled, and thus, the subchannel image identifier would not include the CSSID and/or the IID.

To initially configure an operating system image with one or more subchannel sets, a program referred to as an I/O configuration program (IOCP) is used, in one example. IOCP translates human generated syntax into binary data that can be used by the machine for configuration, when it is powered on, before there is a program to exploit dynamic I/O interfaces. (Dynamic I/O is another way to define I/O, as described below.) Various details regarding IOCP are described in "zSeries Input/Output Configuration Program User's Guide for ICP IOCP," IBM Publication No. SB10-7037-00, First Edition, June 2003, which is hereby incorporated herein by reference in its entirety. The I/O configuration program builds a configuration definition from input data statements and stores the definition in an I/O configuration data set (IOCDS), which is used by the channel subsystem. In one example, the input statements for configuration include the following:

1. An ID statement, which is an optional statement that defines a heading data for I/O configuration reports;
2. A RESOURCE statement, which specifies the channel subsystem images (CSS's) and CSSIDs to be configured, and the logical partitions to be defined within each of those channel subsystem images;
3. One or more CHPID statements used to specify channel paths;
4. One or more control unit statements (CNTLUNIT) used to specify one or more control units attached to the channel paths;
5. One or more I/O device statements (IODEVICE) used to specify one or more I/O devices assigned to the control units. In one example, up to 256 I/O devices can be defined in an I/O device statement. The I/O device statement is also used to specify to which subchannel set a particular device, and thus, subchannel is associated.

In accordance with an aspect of the present invention, the IODEVICE statement has been enhanced by adding a keyword, referred to as SCHSET, to allow the specification of a subchannel set for an I/O device. By indicating on the IODEVICE statement the subchannel set (e.g., 0-3) to which the I/O device is defined, the subchannel associated with the device is implicitly defined to that subchannel set. Thus, a subchannel set is established by all the devices that are defined to the same SCHSET identifier. Therefore, the subchannel numbers of those devices comprise the subchannels of the subchannel set. A device can be associated with multiple subchannel sets by using multiple IODEVICE statements.

The IOCP takes these human generated input statements (e.g., CHPID, CNTLUNIT and IODEVICE) that represent the actual channels, control units and devices that make up a given I/O configuration and generates a file, referred to as an IOCDS, which is made up of different kinds of data structures for a machine to read when it initializes.

One data structure included within the IOCDS is a subchannel data structure. The subchannel data structure includes a field that indicates the subchannel set. Since each channel subsystem image has its own sets of subchannels, the data structures for devices are created on a channel subsystem basis. Thus, a single device that can be accessed from three channel subsystem images has at least three subchannel entries in the IOCDS, one in each of those three channel subsystem images, which allow the device to be independently accessed by the programs configured to each of the channel subsystem images.

Data structures for channel subsystem images not defined in the configuration are not created. This keeps the space used for a given configuration to a minimum.

The I/O configuration definition process is performed for each I/O resource (e.g., channels, control units and/or devices) within a channel subsystem and that collection of input definitions is referred to herein as Channel Subsystem X (a.k.a., Channel Subsystem Image X). If the customer wants multiple channel subsystem images, the customer would repeat the process one or more times for a collection of I/O resources and each collection is called a new channel subsystem or channel subsystem image.

A current configuration can be changed by, for instance, a manager, which is a program that is authorized to perform various commands that provide management functions. The commands used by the manager include Channel Subsystem Call (CHSC) commands, which have a subset of commands also known as dynamic I/O (DIO) commands. The DIO commands have the ability to change the active I/O configuration definition without requiring a restart of the CPC or channel subsystem (e.g., re-IML or a re-IPL) to make the change become effective.

Various CHSC commands are extended to enable the use of multiple subchannel sets. Example of these CHSC commands, without the extensions, are described in Cwiakala et al., U.S. Pat. No. 5,170,472, entitled "Dynamically Changing A System I/O Configuration Definition," issued Dec. 8, 1992, which is hereby incorporated herein by reference in its entirety. In one example, the dynamic I/O commands that are enhanced include, for instance, a Change I/O Device Configuration (CIODC) command and a Change Control Unit Configuration command.

The change I/O device configuration command is used to add, modify, or delete the description of one or more I/O devices in the I/O configuration definition. In one example, the change I/O device configuration command is executed asynchronously and is not interpretively executed. Specification of the operation to be performed and the information used to change the I/O configuration definition is provided in a command request block.

Figure 4A:
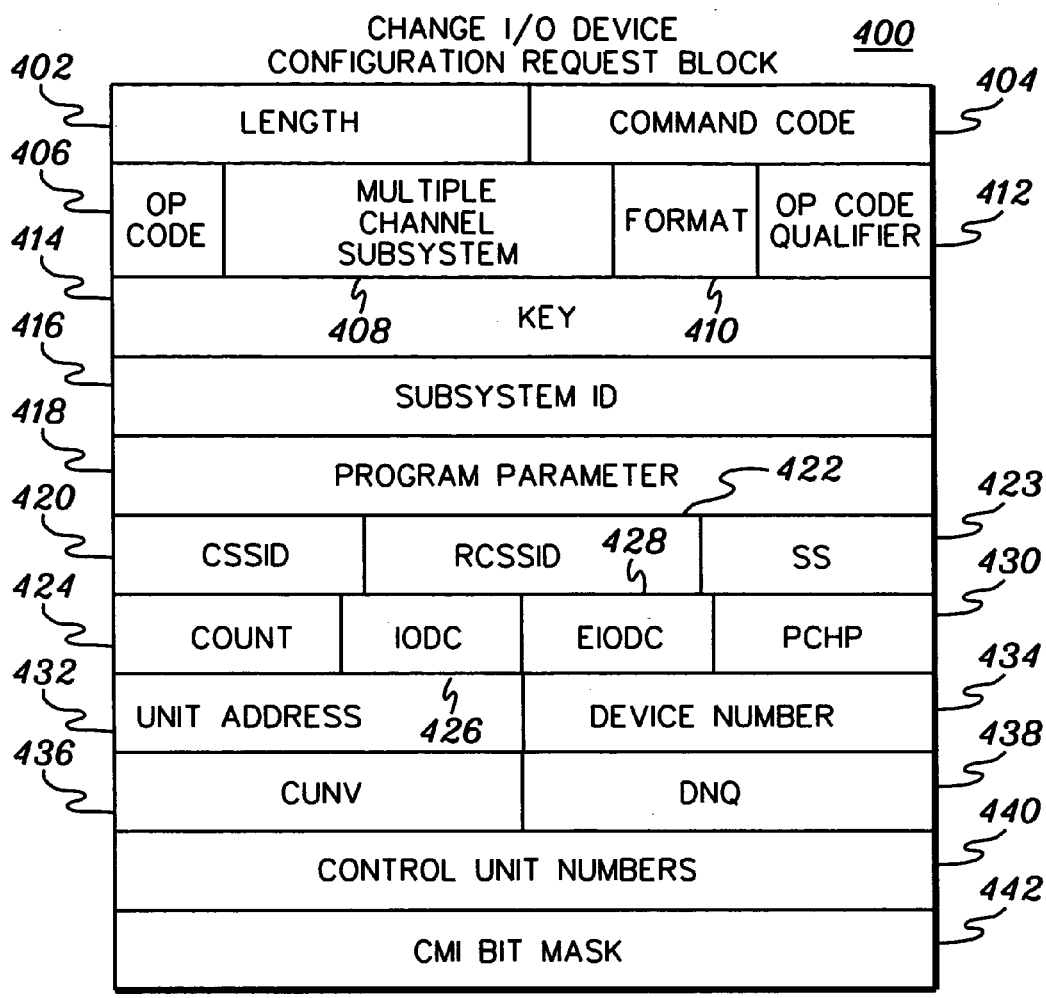
FIG. 4a depicts one embodiment of a request block for a Change I/O Device Configuration command, in accordance with an aspect of the present invention.

One embodiment of a change I/O device configuration command request block is described with reference to FIG. 4a. A change I/O device configuration command request block 400 includes, for instance, the following:

(a) Length Field 402: This field specifies the length of the command request block.

(b) Command Code 404: This field specifies the change I/O device configuration command.

(c) Operation Code (OC) 406: This field includes a value that specifies the type of I/O device configuration operation that is to be performed. The fields of the request data area of the command request block that are used are dependent upon the operation to be performed. The contents of request data area fields that are not specified as being examined for possible use in performing the requested operation are ignored. The meaning of each value is, for instance, as follows:

0 Add the description of the specified I/O devices to the I/O configuration definition.

Subchannels that are added as a result of the add operation are in the initialized state.

When the Multiple Channel Subsystem facility is provided, subchannels that are added are added to the target channel subsystem image specified by the CSSID field.

When the Multiple Subchannel Set facility is provided, subchannels that are added are added to the subchannel set, within the target channel subsystem image, specified by the SS field (described below).

When one or more channel paths that are in the configured state are placed on the list of channel paths that can be used to access the specified I/O devices, the corresponding bits of the path installed mask (PIM) and the path available mask (PAM) for each subchannel associated with the specified I/O devices are set to ones. If the channel paths are in the not-configured state, the appropriate PIM bits are set to ones.

All of the fields except for the DNQ and RCSSID fields are examined for use in performing the add operation.

1 Modify the description of the specified I/O devices in the I/O configuration definition. The type of modification is specified by the operation code qualifier (OCQ).

The M bit, CSSID, SS, count, unit address, device number and DNQ fields are used to identify the I/O devices for which descriptions are to be modified. Additional fields may be used, depending on the contents of the OCQ field. Additional fields that are used are identified in the descriptions of the OCQ values.

2 Delete the description of the specified I/O devices from the I/O configuration definition.

Subchannels that are deleted as a result of the delete operation have the device number valid bit set to zero.

When the Multiple Channel Subsystem facility is provided, the effective CSSID is to specify the remaining channel subsystem image that contains subchannel images for the specified I/O devices.

The M bit, CSSID, SS, count, unit address, device number, and DNQ fields are the only fields that are examined for use in performing the delete operation.

3 Store additional information: One or more subchannel blocks that could not be contained in the command response block for a previous change I/O device configuration command are requested.

When the OC field contains a value of 3, no change is made to the I/O configuration definition.

The contents of the OCQ field, the M bit, the program parameter, CSSID, RCSSID, Count, IODC, EIODC, PCHP, Unit Address, Device Num, CUNV, DNQ, CUNs, and CMI Bit Mask of the request block are ignored.

Successful add, modify, and delete operations cause the I/O configuration changed condition to be set in the channel subsystem.

Successful add, modify, and delete operations cause the channel subsystem to retain the specified program parameter, replacing the current program parameter, if any, in the channel subsystem.

An operation is considered to be successful when the channel subsystem attempts to store a successful response code, even if that attempt is unsuccessful.

(d) Multiple Channel subsystem Bit (M) 408: When the Multiple Channel Subsystem facility is provided by the CPC and is one, the CSSID and RCSSID fields are checked for a valid CSSID. If valid, the values in the CSSID and RCSSID fields become their respective effective CSSIDs. When M is zero, the default CSSID is the effective CSSID and the CSSID and RCSSID fields are to be zero.

(e) Format (FMT) 410: The command request format field contains an unsigned integer whose value specifies the layout of the command request block.

(f) Operation Code Qualifier (OCQ) 412: This field includes a value that qualifies the operation specified by the OC field. The meaning of each value of the OCQ field is, for instance, as follows:

0 The operation specified by the OC field is not qualified by the OCQ field.

1 Add control unit access: The I/O configuration definition is to be modified by adding one or more control units to the current list of control units that can be used to access the specified I/O devices.

If the specified subchannel images or control unit images are not already defined in the specified channel subsystem image, a defined response code may be stored.

Subchannels that are added as a result of the modify (add control unit access) operation are in the initialized state and are not enabled. Subchannels that are added as a result of the modify (add control unit access) operation are added to the same subchannel set as that specified in the command request block to identify the devices being modified.

When one or more channel paths that are in the configured state are placed on the list of channel paths that can be used to access the specified I/O devices, the corresponding bits of the path installed mask (PIM) and the path available mask (PAM) for each subchannel associated with the specified I/O devices are set to ones. If the channel paths are in the not-configured state, the appropriate PIM bits are set to ones.

This OCQ value may be specified, when the OC field specifies the modify operation.

The CUNV and CUN fields are used for this modify operation. The CUNV field is to contain at least one bit that is one. Each valid CUN field specifies a control unit that is to be added to the list of control units for the specified I/O devices.

2 Delete control unit access: The I/O configuration definition is to be modified by deleting one or more control units from the current list of control units that can be used to access the specified I/O devices.

Subchannels that are deleted as a result of the modify (delete control unit access) operation have the device number valid bit set to zero.

When one or more channel paths are deleted from the list of channel paths that can be used to access the specified I/O devices, the corresponding bits of the path installed mask (PIM) and the path available mask (PAM) for each subchannel associated with the specified I/O device are set to zeros.

This OCQ value may be specified, when the OC field specifies the modify operation.

The CUNV and CUN fields are used for this modify operation. The CUNV field is to contain at least one bit that is one. Each valid CUN field specifies a control unit that is to be deleted from the list of control units for the specified I/O devices.

If the removal of access for a control unit results in the removal of a preferred channel path for one or more I/O devices attached to the specified control unit, then it is as if no preferred path has been defined when those I/O devices were initially described in the I/O configuration definition. If the affected I/O devices are to once again have preferred channel paths for I/O operations, the description of those I/O devices is to be changed.

3 Modify I/O device characteristics: The characteristics of the specified I/O devices are to be replaced by the characteristics specified in the IODC field. CTCA mode specification (in the IODC field) is an exception to this rule because the ability to specify CTCA mode is not provided when the OC field specifies the modify operation. I/O device type specification (in the IODC field) is an exception to this rule because the device type being a direct access storage device or not being a direct access storage device is not applicable.

This OCQ value may be specified, when the OC field specifies the modify operation.

The IODC and PCHP fields are used for this modify operation.

When the Multiple Channel Subsystem facility is provided, modification of I/O device characteristics is confined to the scope of the target channel subsystem image specified by the CSSID field. With the exception of the setting of the preferred channel path bit, it is the responsibility of the program to maintain a consistent setting of the device characteristics bits across channel subsystem images that contain subchannels for the specified devices.

4 Add MIF images access: The I/O configuration definition is to be modified by adding one or more MIF images to the list of MIF images within the specified channel subsystem image that provide shared access to the specified I/O device. The candidate MIF images bit mask specifies the additional MIF images through which shared access is to be provided.

In this embodiment, the MIF images within a channel subsystem image that provide shared access to the specified I/O device use the same subchannel number to do so. As viewed through the MIF image to which shared access has been added as a result of the modify operation, the associated subchannel is in the initialized state and is not enabled.

When the channel paths that attach the specified I/O device are in the configured state for a specified MIF image, the corresponding bits of the path installed mask (PIM) and the path available mask (PAM) for the associated subchannel are set to ones. When the channel paths are in the not-configured state, the appropriate PIM bits are set to ones.

This OCQ value can be specified, when the CPC is operating in LPAR mode, the OC field specifies the modify operation, and the specified I/O device is attached to shared channel paths.

The candidate MIF images bit mask is examined for use in performing this operation.

5 Delete MIF image access: The I/O configuration definition is modified by deleting one or more MIF images from the list of MIF images within the specified channel subsystem image that can provide shared access to the specified I/O device. The candidate MIF images bit mask specifies the MIF images from which shared access is to be deleted.

As viewed from the MIF image from which shared access has been deleted as a result of the modify operation, the associated subchannel has the device number valid bit set to zero.

When access by all provided MIF images has been deleted, the specified I/O device descriptions are not deleted from the I/O configuration definition.

This OCQ value can be specified, when the CPC is operating in LPAR mode, the OC field specifies the modify operation, and the specified I/O device is attached to shared channel paths.

The candidate MIF images bit mask is examined for use in performing this operation.

6 Add subchannel image to channel subsystem image: This OCQ value applies, when the multiple channel subsystem facility is provided by the CPC.

The I/O configuration definition is modified by adding subchannel images for the specified I/O devices to the subchannel set, specified by the SS field, within the target channel subsystem image specified by the CSSID field. This introduces access to the devices via one or more specified control units that are configured in the specified target channel subsystem image.

Subchannels that are added as a result of this operation are in the initialized state and are not enabled.

When one or more channel paths that are in the configured state are placed on the list of channel paths that can be used to access the specified I/O devices, the corresponding bits of the path installed mask (PIM) and the path available mask (PAM) for each subchannel associated with the specified I/O devices are set to ones. If the channel paths are in the not-configured state, the appropriate PIM bits are set to ones.

Specified I/O devices are to already exist in the I/O configuration and have subchannel images in the reference channel subsystem image specified by the RCSSID field. Specified I/O devices are not to already have subchannel images in the target channel subsystem image specified by the CSSID field. The reference and target channel subsystem images are not to be the same (CSSID is not to equal RCSSID).

Each valid CUN field is to specify a control unit that already exists in the target channel subsystem image.

The RCSSID, IODC, PCHP, CUNV, CUN, and candidate MIF images bit mask fields are used for this modify operation. The CUNV field is to contain at least one bit that is one. Each valid CUN field specifies a control unit that is added to the list of control units that can be used to access the specified devices.

7 Delete subchannel image from channel subsystem image: This OCQ value applies, when the Multiple Channel Subsystem facility is provided by the CPC. The I/O configuration definition is modified by deleting the subchannel images for the specified I/O devices from the subchannel set specified by the SS field within the target channel subsystem image specified by the CSSID field.

The subchannel images are effectively deleted from the MIF images within the target channel subsystem image. Subchannels that are deleted as a result of this modify operation have the device number valid bit set to zero.

The specified devices being deleted by this operation are to have subchannel images currently defined in more than one channel subsystem image.

(g) Key 414: This field includes the storage access key used by the channel subsystem to access the command request block and the command response block for asynchronous operations that are initiated by the command.

(h) Subsystem ID 416: This field specifies the CHSC subchannel that is used to perform operations that are asynchronous to CHSC execution.

(i) Program Parameter 418: This field includes a value that the program associates with this change I/O device configuration command.

(j) Channel subsystem Image ID (CSSID) 420: When the Multiple Channel Subsystem facility is provided by the CPC, this field may specify the CSSID of the target channel subsystem image that is used to locate the preferred channel path that is specified by the PCHP field, the I/O devices that are specified by the device number and count fields, and any control units specified by the CUNV and CUN fields. The CSSID is subject to range and existence checking.

(k) Reference Channel subsystem Image ID (RCSSID) 422: When the Multiple Channel Subsystem facility is provided and the modify (add subchannel image to channel subsystem image) operation is specified, this field includes the CSSID of a reference channel subsystem image from which device attributes are inherited for the devices specified by the device number and count fields. For all other operations, this field includes zero. The RCSSID value is subject to range and existence checking.

(l) Subchannel Set ID (SS) 423: When the Multiple Subchannel Set facility is provided by the CPC, this field includes a value (e.g., a 2-bit unsigned integer) that specifies the subchannel set of the I/O devices that are specified by the device number field and count fields.

(m) Count 424: This field specifies one less than the number of I/O devices that are the object of the change I/O device configuration command. Device numbers for the specified I/O devices are determined by using consecutive device numbers beginning with the value contained in the device number field. Similarly, unit addresses for the specified I/O devices are determined by using consecutive unit addresses beginning with the value contained in the unit address field.

(n) I/O Device Characteristics (IODC) 426: This field specifies characteristics of the specified I/O devices. The contents of the IODC field are meaningful, when the OC field specifies the add operation, or the OC field specifies the modify operation and the OCQ field specifies modify I/O device characteristics. The preferred channel path bit of the IODC field is meaningful, when the OC field specifies the modify operation and the OCQ field specifies add subchannel image to channel subsystem image. The meanings of bits 0-7 are, for example, as follows:

| Bits | Meaning |
|---|---|
| 0 | Time Out: When zero, bit 0 specifies that the time out function is not active for the specified I/O devices. When one, bit 0 specifies that the time out function is active for the specified I/O devices. Bit 0 is ignored and the time out function is active for I/O devices that can be accessed by means of parallel byte multiplexer channels, serial-I/O channels, fibre channel channels, and fibre channel converted channels, as examples. Bit 0 is ignored and the timeout function does not apply for I/O devices that can be accessed by means of internal-system-device channels, direct-system-device channels, emulated-I/O channels, OSA-express channels, OSA-direct-express channels, open-fibre-channel-protocol-channels, and internal-queued-direct-communication channels, as examples. |
| 1 | Status Verification: When zero, bit 1 specifies that status verification will not be performed for status that is presented by the specified I/O devices. When one, bit 1 specifies that status verification will be performed for status that is presented by the specified I/O devices. Bit 1 is ignored and the status verification function does not apply for I/O devices that can be accessed by means of direct-system-device channels, emulated-I/O channels, OSA-express channels, OSA-direct-express-channels, open-fibre-channel-protocol channels, and internal-queued-direct-communication channels, as examples. |
| 2 | Preferred Channel Path: When zero, bit 2 specifies that there is no preferred channel path that is to be used when there are I/O requests for the specified I/O devices, and the contents of the PCHP field have no meaning. When one, bit 2 specifies that there is a preferred channel path that is to be used when there are I/O requests for the specified I/O devices, and the contents of the PCHP field identify that channel path. |
| 3 | I/O device type specification: When zero, bit 3 indicates that the specified I/O devices are not direct access storage devices. When one, bit 3 indicates that the specified I/O devices are direct access storage devices. |
| 4 | CTCA Mode Specification: When zero, bit 4 indicates that the specified I/O devices are CTCA-type I/O devices that provide extended mode CTCA capabilities. When one, bit 4 indicates that the specified I/O devices are CTCA-type I/O devices that provide basic mode CTCA capabilities. Bit 4 has meaning under the following conditions: The OC field specifies the add operation. Only one CUN field is specified as containing valid information. The channel path to which the specified control unit is attached is an ESCON serial-I/O channel path that can be used to provide access to a channel-to-channel adapter (CTCA) in the CPC that contains that channel path. Otherwise, bit 4 has no meaning and is ignored. |
| 5–7 | Reserved. |

(o) Extended I/O Device Characteristics (EIODC) 428: This field specifies additional characteristics of the specified I/O devices. A bit of the EIODC field is meaningful independent of the values specified in the OC and OCQ fields, unless specified otherwise in the description of the bit. The meanings of bits 0-7 are as follows:

| Bits | Meanings |
|---|---|
| 0 | Conflict Response Code Control: Bit 0 of the EIODC field determines which response code should be stored in the response block, if the channel subsystem detects a conflict while attempting to make a requested change to the list of candidate MIF images that can share the specified I/O device. When bit 0 of the EIODC field is zero and the following conditions, as one example, apply, the channel subsystem stores an appropriate response code in the response block: The CPC is operating in LPAR mode. Bit 30 of the general characteristics field in a response block for a Store Channel Subsystem Characteristics command is one, indicating that the fibre-channel (FC) facilities are provided. The Store Channel Subsystem Characteristics command is used to store information about the characteristics of the channel subsystem including, for instance, whether the MCSS and/or MSS facility are provided. The OC field specifies the modify operation. The specified I/O devices are attached to one or more shared channel paths. One or more of the MIF images specified in the candidate MIF images bit mask already has access to the specified device (in the case of addition), or one or more of the MIF images specified in the candidate MIF images bit mask does not have access to the specified device (in the case of deletion). When bit 0 of the EIODC field is one and the above conditions apply, the channel subsystem stores an appropriate response code in the response block. Otherwise, bit 0 has no meaning and is ignored. |
| 1–7 | Reserved |

(p) Preferred Channel Path (PCHP) 430: When the contents of the IODC field apply and bit 2 is one, this field specifies the channel path identifier (CHPID) of the first channel path that the channel subsystem is to attempt to use when there are I/O requests for the specified I/O devices. When the Multiple Channel Subsystem facility is provided, the effective CSSID specifies the channel subsystem image in which the devices and preferred channel path are located.

(q) Unit Address 432: When the count field contains a value of zero, this field includes the unit address for the specified I/O device. When the count field contains a value that is greater than zero, this field includes a unit address that is the first of a range of unit addresses for the specified I/O devices.

(r) Device Number 434: When the count field contains a value of zero, this field includes a binary representation of the device number for the specified I/O device. When the count field contains a value that is greater than zero, this field includes a device number that is the first of a range of device numbers for the specified I/O devices. When the Multiple Channel Subsystem facility is provided, the effective CSSID specifies the channel subsystem image in which the devices are located.

The same number space is used for both I/O device number and message device number values.

(s) Control Unit Validity (CUNV) 436: This field specifies which of the control unit number (CUN) fields contain valid information.

Bits 0-7 of the CUNV field correspond, from left to right, with each of the eight CUN fields. When one, a CUNV bit specifies that the corresponding CUN field contains a valid control unit number. When zero, a CUNV bit specifies that the corresponding CUN field does not contain a valid control unit number and is ignored.

When the OC field specifies the add operation, the CUNV field is not to contain all zeros. The contents of the valid CUN fields identify the control units that can be used to access the specified I/O devices.

When the OC field specifies the modify operation and the OCQ field specifies add or delete control unit access or add subchannel image to channel subsystem image, the CUNV field is not to contain all zeros. The contents of the valid CUN fields identify control units that are to be added to or deleted from the list of control units that can be used to access the specified I/O devices.

When the Multiple Channel Subsystem facility is provided, the OC field specifies modify, and the OCQ field specifies add subchannel image to channel subsystem image, the specified control units are to have access to the target channel subsystem image specified by the CSSID field.

(t) Device Number Qualifier (DNQ) 438: The device number qualifier can be used to distinguish I/O devices that are attached to the specified control unit from I/O devices that have the same device number and are attached to other control units.

I/O devices that are attached to the same control unit and have the same device number can be distinguished by the unit address associated with each I/O device.

I/O devices that are attached to different control units and have the same device number can be distinguished by placing the control unit number of the control unit to which the I/O devices are attached in the DNQ field.

(u) Control Unit Numbers (CUN) 440: When bits 0-7 of the CUNV field are not all zeros, this field includes up to, for instance, eight control unit numbers. Each CUN field that is specified as being valid by the contents of the CUNV field contains a unique identifier of a control unit that can be used to access the specified I/O devices.

Control unit numbers and message processor numbers share the same number space.

(v) Candidate MIF Images Bit Mask 442: When the CPC is operating in LPAR mode and the specified device is attached to one or more shared channel paths, this mask is used to specify which MIF images are to provide shared access to the specified I/O device.

This mask is ignored when the specified I/O device is attached to unshared channel paths, the OC field specifies the delete or modify (delete subchannel image from channel subsystem image) operation, or the CPC is operating in basic mode.

A MIF image can be a candidate, even if it does not have access to any of the channel paths to which the device is attached.

A candidate MIF image can provide access to the specified device concurrently with other candidate MIF images, provided that it has access to one or more of the shared channel paths to which the device is attached.

There is a one-to-one numerical correspondence between MIF image IDs (IIDs) and the bit position numbers in this mask. A one in a particular bit position of this mask specifies an IID that has a value equal to the corresponding bit number.

When the OC field specifies the add or modify (add subchannel image to channel subsystem image) operation, a one in a bit position of this bit mask indicates that the corresponding MIF image within the target channel subsystem image is a candidate for providing access to the specified I/O devices. A zero in a bit position of this mask indicates that the corresponding MIF image is not a candidate for providing access to the specified I/O device. At least one bit (of this bit mask) is to be one and correspond to a MIF image that is provided.

When the OC field specifies the modify operation and the OCQ field specifies the add MIF image access operation, a one in a bit position of this bit mask indicates that the corresponding MIF image is to be added as a candidate within the specified target channel subsystem image for providing access to the specified I/O devices. A zero in a bit position of this mask indicates that the corresponding MIF image is not to be added as a candidate for providing access to the specified I/O devices, although it may already be a candidate. At least one bit (of this bit mask) is to be one and correspond to a MIF image that is provided, and no bits can be one that correspond to MIF images that already are candidate MIF images for the specified I/O devices within the specified target channel subsystem image.

When the OC field specifies the modify operation and the OCQ field specifies the delete MIF image access operation, a one in a bit position of this bit mask indicates that the corresponding MIF image is to be deleted as a candidate within the specified target channel subsystem image for providing access to the specified I/O devices. A zero in a bit position of this mask indicates that the correspondingly numbered MIF image is not to be deleted as a candidate for providing access to the specified I/O devices. At least one bit (of this bit mask) is to be one and correspond to a MIF image that is provided, and all bits that are one are to correspond to MIF images that are candidate MIF images for providing access to the specified I/O devices.

Figure 4B:
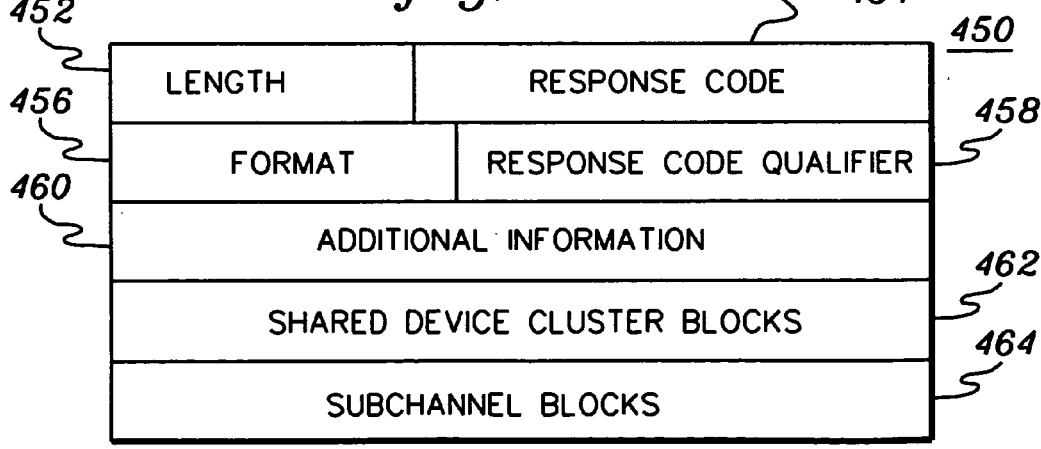
FIG. 4b depicts one embodiment of a response block for the Change I/O Device Configuration command, in accordance with an aspect of the present invention.

One embodiment of a command response block for a Change I/O Device Configuration command is described with reference to FIG. 4*b*. In one example, a command response block 450 includes, for instance, the following:

(a) Length Field 452: This field specifies the length of the command response block. The length depends on the response code that is stored in the response code field as a result of the attempt to execute the change I/O device configuration command, and on the type and amount of information to be stored.

(b) Response Code 454: This field includes an unsigned binary integer that describes the results of the attempt to execute the change I/O device configuration command.

(c) Format (FMT) 456: The command response format field includes an unsigned integer whose value specifies the layout of the command response block.

(d) Response Code Qualifier (RCQ) 458: When a response code other than a code indicating success is stored in the response code field, this field may include a model dependent value that can be used to further describe the condition specified by the response code.

(e) Additional Information (A) 460: When one, this field specifies that the channel subsystem has additional subchannel blocks that cannot be contained in this command response block. When zero, this field specifies that the channel subsystem has no subchannel blocks in addition to those (if any) that are contained in this command response block.

The execution of a change I/O device configuration command that specifies the add, modify (add or delete control unit access or add subchannel image to channel subsystem image or delete subchannel image from channel subsystem image) or delete operation can result in the creation of more subchannel blocks than can be contained in the command response block. In this case, the channel subsystem creates a set of command response blocks.

A first of the set of command response blocks is provided as part of the execution of the change I/O device configuration command that caused the set of command response blocks to be created. The program can obtain the remaining command response blocks by repeatedly executing the change I/O device configuration command with the store additional information operation specified. Each remaining response block contains one or more consecutive subchannel blocks. The last command response block of the set has an A bit that is zero.

(f) Shared Device Cluster (SDC) Blocks 462: This field includes, as one example, eight shared device cluster (SDC) blocks. Each SDC block that is specified as being valid describes a shared device cluster that contains one or more of the I/O devices that are specified in the command request block of the change I/O device configuration command that caused the SDC block to be created.

A shared device cluster is either a single control unit that can provide access to at least one I/O device, but does not share access to I/O devices with any other control unit, or it can be a collection of control units and I/O devices that are connected in such a way that for any division of the total collection of control units into two subsets, at least one control unit in each subset shares access to at least one I/O device.

Figure 4C:
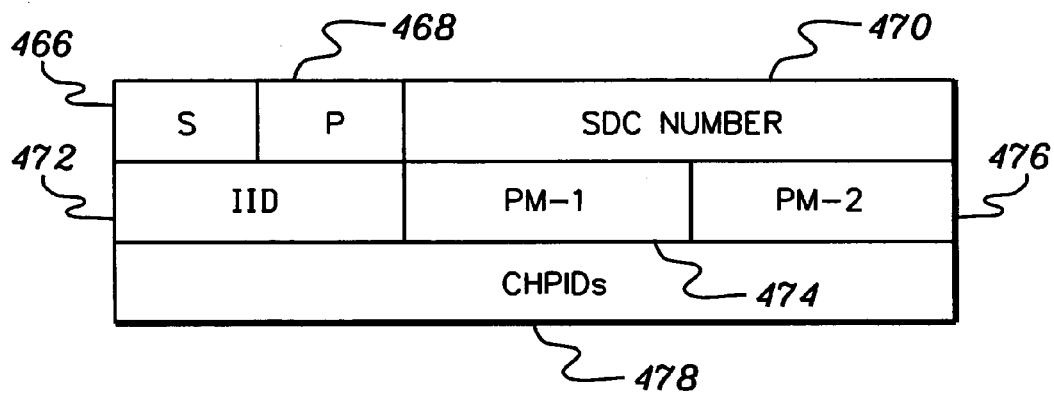
FIG. 4c depicts one embodiment of a shared device cluster block of the response block of FIG. 4b, in accordance with an aspect of the present invention.

One example of an SDC block is described with reference to FIG. 4c. SDC block 462 includes, for instance, the following:

(aa) SDC Validity Bit (S) 466: When one, this field specifies that the associated SDC block is valid. When zero, this field specifies that the associated SDC block is not valid and there are no subsequent SDC blocks in the command response block that are valid.

(bb) Image ID Validity Bit (P) 468: When one, this field specifies that the IID field contains a valid MIF image ID. When zero, this field specifies that the contents of the IID field are meaningless. The P bit can be one, when the CPC is operating in LPAR mode. When the SDC is associated with shared channel paths, it is set to zero.

(cc) Shared Device Cluster (SDC) Number 470: This field includes an SDC number that identifies the shared device cluster described by this SDC block. Within a channel subsystem image, every SDC has a unique number.

(dd) MIF Image ID (IID) 472: When the CPC is operating in LPAR mode and the P bit is one, this field includes the image identification code (IID) of the MIF image in which the specified SDC is recognized.

(ee) Path Mask-1 (PM-1) 474: This field specifies the CHPID fields that identify the channel paths that are described in the I/O configuration definition for the specified SDC. (The PM-1 field corresponds to a path installed mask (PIM).) Each bit of the PM-1 field corresponds one-for-one, by relative position, with each of the CHPID fields. A PM-1 bit stored as one specifies that the contents of the corresponding CHPID field identify a channel path for the specified SDC. A PM-1 bit stored as zero specifies that the contents of the corresponding CHPID field have no meaning.

(ff) Path Mask-2 (PM-2) 476: When the CPC is operating in LPAR mode, this field specifies the CHPID fields that identify the channel paths for the specified SDC that are configured to the specified MIF image. (For unshared channel paths, the PM-2 field corresponds to a path available mask (PAM).) Each bit of the PM-2 field corresponds one-for-one, by relative position, with each of the CHPID fields. A PM-2 bit stored as one specifies that the contents of the corresponding CHPID field identify a channel path for the specified SDC and the specified MIF image. A PM-2 bit stored as zero specifies that the contents of the corresponding CHPID field have no meaning.

A PM-2 bit may be one, if the corresponding bit of the PM-1 field is one. When the CPC is operating in LPAR mode and the specified channel paths are shared channel paths, the contents of the PM-2 field have no meaning. When the CPC is operating in basic mode, the PM-2 field has no meaning.

(gg) Channel Path Identifiers (CHPIDs) 478: This field includes, for example, eight CHPID fields. The CHPID fields that correspond to the bits of the PM-1 field that are ones contain the CHPIDs of channel paths for the specified SDC. The contents of CHPID fields that correspond to the bits of the PM-1 field that are zeros are meaningless.

(g) Subchannel Blocks 464 (FIG. 4b): When the length field contains a value greater than a predetermined number (e.g., 90 hex), this field includes one or more subchannel blocks. Each subchannel block describes a subchannel that is affected by the requested change to the I/O configuration.

Figure 4D:
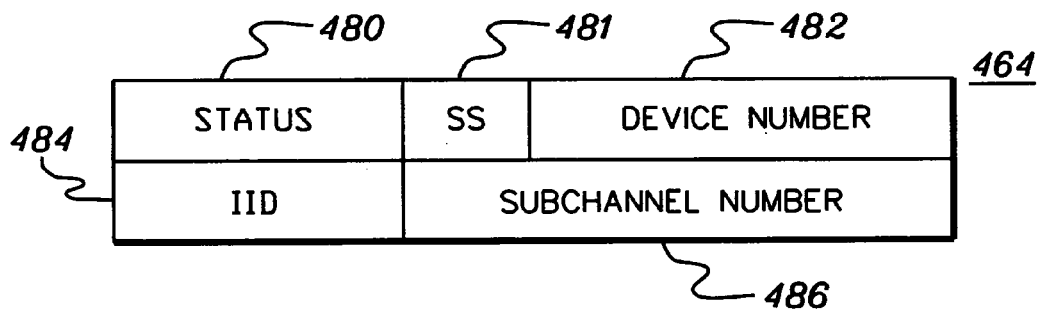
FIG. 4d depicts one embodiment of a subchannel block of the response block of FIG. 4b, in accordance with an aspect of the present invention.

One example of a subchannel block is described with reference to FIG. 4d. Subchannel block 464 includes, for instance, the following:

(aa) Status 480 (FIG. 4d): This field includes information regarding the status of the corresponding I/O device. The meanings of bits 0-7 are, for instance, as follows:

| Bits | Meanings |
|---|---|
| 0 | When one, bit 0 specifies that the installed parameters for the specified subchannel have been set to the initialized state. When zero, bit 0 specifies that the installed parameters for the specified subchannel have been modified, but they are not set to the initialized state. |
| 1 | When one, bit 1 specifies that the IID field contains a valid MIF image ID. When zero, bit 1 specifies that the contents of the IID field are meaningless. This bit can be one, when the CPC is operating in LPAR mode. |
| 2 | When the OC field of the command request block of the change I/O device configuration command that caused this subchannel block to be created specifies the modify (delete control unit access or delete MIF image access or delete subchannel image from channel subsystem image) or delete operation, bit 2 specifies whether a dedicated allegiance condition existed or whether the channel subsystem was in the process of accepting status that contained unit check, when the change I/O device configuration command was performed for the specified I/O device. When zero, bit 2 specifies that a dedicated allegiance condition did not exist. When one, bit 2 specifies that a dedicated allegiance condition did exist, and bit 3 of the status field specifies whether the channel subsystem was able to clear the associated contingent allegiance condition at the device. When the OC field of the command request block of the change I/O device configuration command that caused this subchannel block to be created does not specify the modify (delete control unit access or delete MIF image access or delete subchannel image from channel subsystem image) or delete operation, bit 2 has no meaning. |
| 3 | When bit 2 of the status field has meaning and is one, bit 3 specifies whether the channel subsystem was able to clear the contingent allegiance condition at the specified I/O device. When zero, bit 3 specifies that the channel subsystem was able to clear the contingent allegiance condition (which could result in zero sense date). When one, bit 3 specifies that the channel subsystem was unable to clear the contingent allegiance condition. When bit 2 of the status field has no meaning or has meaning and is zero, bit 3 has no meaning. |
| 4 | When the OC field of the command request block of the change I/O device configuration command that caused this subchannel block to be created specifies the modify (delete control unit access or delete MIF image access or delete subchannel image from channel subsystem image) or delete operation, bit 4 specifies |

-continued

| Bits | Meanings |
|---|---|
|  | whether an I/O operation was in progress when the change I/O device configuration command was performed for the specified I/O device. When zero, bit 4 specifies that an I/O operation was not in progress. When one, bit 4 specifies that an I/O operation was in progress, and bit 5 of the status field specifies whether the channel subsystem was able to terminate the I/O operation at the specified I/O device.<br>When the OC field of the command request block of the change I/O device configuration command that caused this subchannel block to be created does not specify the modify (delete control unit access or delete MIF image access or delete subchannel image from channel subsystem image) or delete operation, bit 4 has no meaning. |
| 5 | When bit 4 of the status field has meaning and is one, bit 5 specifies whether the channel subsystem was able to terminate the I/O operation at the specified I/O device. When zero, bit 5 specifies that the channel subsystem was able to terminate the I/O operation at the I/O device. When one, bit 5 specifies that the channel subsystem was unable to terminate the I/O operation at the I/O device.<br>When bit 4 of the status field has no meaning or has meaning and is zero, bit 5 has no meaning. |
| 6 | When the OC field of the command request block of the change I/O device configuration command that caused this subchannel block to be created specifies the modify (delete control unit access or delete MIF image access or delete subchannel image from channel subsystem image) or delete operation, bit 6 specifies whether the enabled bit (of the PMCW) was one or zero for the specified subchannel, when the channel subsystem started to perform the requested operation. When zero, bit 6 specifies that the enabled bit was zero. When one, bit 6 specifies that the enabled bit was one.<br>When the OC field of the command request block of the change I/O device configuration command that caused this subchannel block to be created does not specify the modify (delete control unit access or delete MIF image access or delete subchannel image from channel subsystem image) or delete operation, bit 6 has no meaning. |
| 7 | When the OC field of the command request block for the change I/O device configuration command that caused this subchannel block to be created specifies the modify (delete control unit access or delete MIF image access or delete subchannel image from channel subsystem image) or delete operation and the CPC is operating in LPAR mode, bit 7 specifies whether the interruption interlock control bit (of the PMCW) was one or zero for the specified subchannel, when the channel subsystem started to perform the requested operation. When zero, bit 7 specifies that the interruption interlock bit was zero. When one, bit 7 specifies that the interruption interlock bit was one.<br>When the OC field of the command request block of the change I/O device configuration command that caused this subchannel block to be created does not specify the modify (delete control unit access or delete MIF image access or delete subchannel image from channel subsystem image) or delete operation, bit 7 has no meaning. |

(bb) Subchannel Set ID (SS) 481: When the Multiple Subchannel Set facility is provided by the CPC, this field includes a value (e.g., a 2-bit, unsigned integer) that specifies the subchannel set ID that is for the subchannel specified by the subchannel number (SCH Number) field.

(cc) Device Number 482: This field includes a binary representation of the device number for the I/O device that is associated with the specified subchannel.

(dd) MIF Image ID (IID) 484: When the CPC is operating in LPAR mode and bit 1 of the status field is one, this field includes the image identification code (IID) of the MIF image with which the specified subchannel is associated. Otherwise, the contents of the IID field have no meaning.

(ee) Subchannel Number 486: This field specifies the subchannel to which the information in this subchannel block applies.

In one example, when the CPC is operating in LPAR mode, the following statements apply:

When the OC field specifies the add operation or modify (add MIF image access) operation, one subchannel image is added for each MIF image specified in the candidate MIF images bit mask, independently of whether the corresponding MIF image has access to any of the channel paths to which the device is attached. Each added subchannel image within the specified channel subsystem image is configured with the same subchannel number and each MIF image can be used to concurrently access the specified device provided that the MIF image has access to one or more of the shared channel paths to which the device is attached.

When the OC field specifies the delete or modify (delete subchannel image from channel subsystem image) operation, the subchannel images for provided MIF images within the specified channel subsystem image are deleted from the I/O configuration definition.

When the OC field specifies the modify (delete MIF image access) operation, the subchannel images for each MIF image specified in the candidate MIF images bit mask for the specified channel subsystem image are deleted from the I/O configuration definition.

When the CPC is operating in LPAR mode, the logical partition hypervisor, not the channel subsystem in this example, ensures that a maximum of one subchannel within a given channel subsystem image and subchannel set for a given device number is configured to a logical partition at any instant in time, regardless of the number of subchannels defined in the I/O configuration definition that have the same device number.

As indicated above, another command enhanced for MSS is a Change Control Unit Configuration command. This command is used to add, modify, or delete the description of a control unit in the I/O configuration definition. The change control unit configuration command can be executed asynchronously and is not interpretively executed, in one example. Specification of the operation to be performed and the information required to change the I/O configuration definition are provided in a command request block.

Figure 5A:
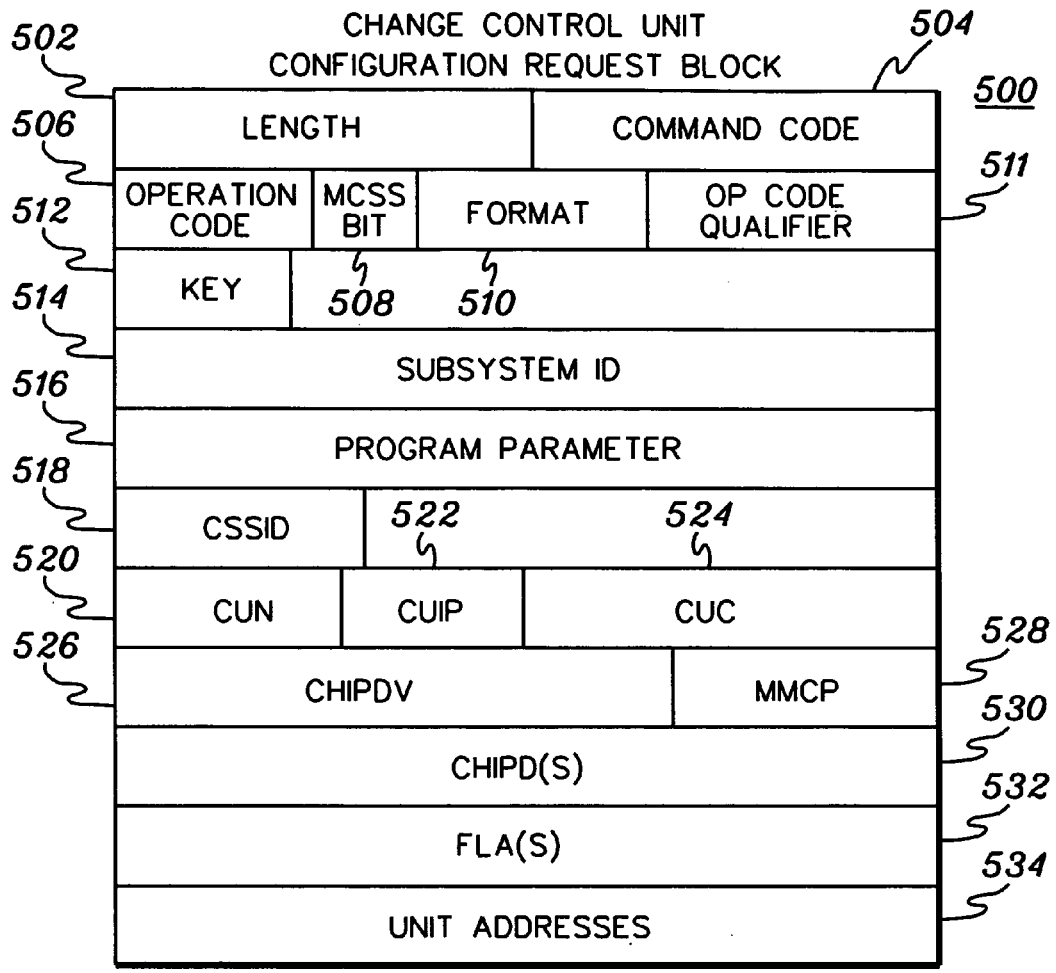
FIG. 5a depicts one embodiment of a request block for a Change Control Unit Configuration command, in accordance with an aspect of the present invention.

One embodiment of a request block for a change control unit configuration command is described with reference to FIG. 5a. In one example, a request block 500 includes, for instance:

(a) Length Field 502: This field specifies the length of the block.

(b) Command Code 504: This field specifies the change control unit configuration command.

(c) Operation Code (OC) 506: This field includes a value that specifies the type of control unit configuration operation that is to be performed. The fields of the request data area of the command request block that are used are dependent upon the operation to be performed. The meaning of each value is, for example, as follows:

0 Add the description of the specified control unit to the I/O configuration definition.

1 Modify the description of the specified control unit in the I/O configuration definition. The type of modification is specified by the operation code qualifier (OCQ). The CUN field is used to identify the control unit for which the description is to be modified. Additional fields may be used, depending on the contents of the OCQ field. Additional fields that are used are identified in the descriptions of the OCQ values.

2 Delete the description of the specified control unit image from the I/O configuration definition. The effective CSSID is to specify the remaining channel subsystem image that contains the control unit image. The CUN field is examined for use in performing the delete operation.

3 Store additional information: One or more subchannel blocks that could not be contained in the command response block for a previous change control unit configuration command are requested.

Successful add, modify, and delete operations cause the I/O configuration changed condition to be set in the channel subsystem. Successful add, modify, and delete operations cause the channel subsystem to retain the specified program parameter, replacing the current program parameter, if any, in the channel subsystem.

(d) Multiple Channel Subsystem Bit (M) 508: When the Multiple Channel Subsystem facility is provided by the CPC, then when M is one, the CSSID field is checked for a valid CSSID. If valid, the value in the CSSID field becomes the effective CSSID. When M is zero, the default CSSID is the effective CSSID.

(e) Format (FMT) 510: The command request format field includes an unsigned integer whose value specifies the layout of the command request block. The request block described herein is format zero, as one example.

(f) Operation Code Qualifier (OCQ) 511: This field includes a value that qualifies the operation specified by the OC field. The meaning of each value of the OCQ field is, for instance, as follows:

0 The operation specified by the OC field is not qualified by the OCQ field.

1 Add channel path access: The I/O configuration definition is modified by adding one or more channel paths to the current list of channel paths that can be used to access the specified control unit. When the Multiple Channel Subsystem facility is provided by the CPC, this form of modification applies, when the specified control unit image is defined to the channel subsystem image specified by the CSSID field.

Subchannels that are added as a result of the modify (add channel path access) operation are in the initialized state and are not enabled. Each added subchannel is added, in one example, to the same subchannel set already associated with the corresponding I/O device.

When one or more channel paths that are in the configured state are placed on the list of channel paths that can be used to access the specified control unit, the corresponding bits of the path installed mask (PIM) and the path available mask (PAM) for subchannels associated with I/O devices that are described as being attached to the specified control unit are set to ones. If the channel paths are in the not-configured state, the appropriate PIM bits are set to ones.

This OCQ value may be specified, when the OC field specifies the modify operation.

The M bit, CSSID field, CHPIDV, and CHPID fields are used for this modify operation. The FLA fields are used when the corresponding channel paths are channel path types that adhere to the serial-I/O architectures, and the link address portions of the FLA fields may be used (depending on the model), when the corresponding channel paths are fiber-extended channel paths, or fibre-channel channel paths.

2 Delete channel path access: The I/O configuration definition is modified by deleting one or more channel paths from the current list of channel paths that can be used to access the specified control unit.

Subchannels that are deleted as a result of the modify (delete channel path access) operation have the device number valid bit set to zero.

When one or more channel paths are deleted from the list of channel paths that can be used to access the specified control unit, the corresponding bits of the path installed mask (PIM) and the path available mask (PAM) for subchannels associated with I/O devices that are described as being attached to the specified control unit are set to zeros.

This OCQ value may be specified, when the OC field specifies the modify operation.

The M bit, CSSID field, CHPIDV, and CHPID fields are used for this modify operation. The CHPIDV field is to contain at least one bit that is one. Each valid CHPID field specifies a channel path that is to be deleted from the list of channel paths for the specified control unit.

3 Add unit address: The I/O configuration definition is modified by adding one or more unit addresses to the current list of unit addresses that are recognized by the specified control unit. Each added unit address becomes available to any logical partition that has channel path accessibility to the control unit.

This OCQ value may be specified, when the OC field specifies the modify operation.

The unit address field is used for this modify operation.

4 Delete unit address: The I/O configuration definition is modified by deleting one or more unit addresses from the current list of unit addresses that are recognized by the specified control unit. Each deleted unit address becomes unavailable to any logical partition that has channel path accessibility to the control unit.

This OCQ value may be specified, when the OC field specifies the modify operation.

The unit address field is used for this modify operation.

5 Modify the maximum managed channel path (MMCP) value: The maximum number of managed channel paths to which the specified control unit can be attached is changed to the value specified in the MMCP field, provided that certain conditions are satisfied.

When the Multiple Channel Subsystem (MCSS) facility is provided by the CPC, the effective CSSID associated with such a request may be used to determine the channel subsystem image to which the change is confined. Thus, the effective scope of a successful modification of the maximum managed channel path of the specified control unit may be limited to the channel subsystem image specified on the request to change the MMCP value. Any other access of the control unit via a different channel subsystem image continues to observe the MMCP value that existed prior to the change. Another request via a different channel subsystem image may make its own, independent MMCP change request.

This OCQ value may be specified, when the dynamic CHPID management facility is provided by the CPC and the OC field specifies the modify operation. When the dynamic CHPID management facility is not provided by the CPC, the OCQ value of 5 is reserved.

The MMCP count, the M bit and CSSID fields are used for this modify operation.

6 Add CU image to CSS image: This operation code qualifier applies when the Multiple Channel Subsystem facility is provided by the CPC. The control unit is to already be in the I/O configuration definition, and thus, at least one control unit image is established, although not from the channel subsystem image specified by the effective CSSID. The I/O configuration definition is modified by adding a control unit image to the channel subsystem image specified by the effective CSSID, and thus, introducing access to the control unit from the channel subsystem image via one or more specified channel paths.

The M bit, CSSID field, CHPIDV, CHPID, and MMCP fields are used for this modify operation. The FLA fields are used, when the corresponding channel paths are channel path types that adhere to the serial-I/O architectures, and the link address portions of the FLA fields may be used (depending on the model and presence of one or more switches, when applicable), when the corresponding channel paths are fiber extended channel paths, or fibre channel channel paths.

7 Delete CU image from CSS image: This operation code qualifier applies when the Multiple Channel Subsystem facility is provided by the CPC. The I/O configuration definition is modified by deleting a specified control unit image from the channel subsystem image. If the specified control unit image is not defined in the channel subsystem image, a response code may be stored.

The M bit and CSSID fields are used for this modify operation.

(g) Key 512: This field includes a storage access key used by the channel subsystem to access the command request block and the command response block for asynchronous operations that are initiated by the command.

(h) Subsystem ID (SID) 514: The SID field specifies the CHSC subchannel that is used to perform operations that are asynchronous to CHSC execution.

(i) Program Parameter 516: This field includes a value that the program associates with this change control unit configuration command.

(j) CSSID 518: When the Multiple Channel Subsystem facility is provided by the CPC, this field may specify the CSSID used to locate the target channel subsystem image, and thus, locate the channel paths whose CHPIDs are specified. The CSSID value is subject to range and existence checking.

(k) Control Unit Number (CUN) 520: This field specifies a number that is used to identify the control unit that is the object of the change control unit configuration command.

(l) Control Unit Interface Protocol (CUIP) 522: This field specifies the type of protocol used by the specified control unit to communicate on the attaching I/O interfaces. The meaning of each value is, for instance, as follows:

0 Direct-Current (DC) interlocked (applies to parallel channels).

1 3-megabyte-per second data streaming (applies to parallel channels).

2 4.5 megabyte-per-second data streaming (applies to parallel channels).

3 Serial-I/O protocols.

4 Open System Adapter (OSA) protocols.

When the operation code field specifies the add operation and one or more of the specified channel paths are an internal-system-device channel or fibre-channel-converted channel-path type, serial-I/O protocols are to be specified in the CUIP field.

In one example, the contents of the CUIP field have no meaning for certain channel path types (e.g., those that are not parallel, serial-I/O, OSA, internal-system-device, or fibre-channel-converted channels).

(m) Control Unit Characteristics (CUC) 524: This field specifies characteristics of the specified control unit. The meaning of bits 0-7 is, for instance, as follows:

| Bits | Meaning |
| --- | --- |
| 0 | Concurrency level of I/O requests: When zero, this bit specifies that the control unit supports only one I/O request at a time. When one, this bit specifies that the control unit supports multiple I/O requests concurrently.<br>The concurrency level bit has meaning, when the channel paths to which the control unit is attached are parallel channels or fiber-extended channels (byte or block). Otherwise, the concurrency level bit is ignored. |
| 1 | CTC-control-unit-type specification: When zero, bit 1 indicates that the specified control unit is not a FICON CTC control unit. When one, bit 1 indicates that the specified control unit is a FICON CTC control unit. This bit is meaningful, when the OC field specifies the add operation. Otherwise this bit is ignored. When the specified control unit is a FICON CTC control unit the following conditions apply.<br>The MMCP field is ignored.<br>When the OC field specifies the modify operation, and the OCQ field specifies the modify the MMCP value function, a response code is stored in the response block.<br>One CHPID field and its corresponding FLA field is specified as containing valid information.<br>The channel path type to which the specified control unit is attached is a fibre-channel path. |

(n) Channel Path Identifier Validity (CHPIDV) 526: This field specifies which of the CHPID and FLA fields (if applicable) contain valid information. Bits 0-7 of the CHPIDV field correspond, from left to right, to each of the eight CHPID fields. When one, a CHPIDV bit specifies that the corresponding CHPID field contains a valid channel path identifier.

When the OC field specifies the add operation, or the OC field specifies the modify operation and the OCQ field specifies add or delete channel path access, the CHPIDV field is not to contain all zeros and the corresponding CHPID fields contain valid information; otherwise, the contents of the CHPID fields are ignored.

When the CHPID fields contain valid information and the corresponding channel paths are serial-I/O type, fibre-channel, fibre-channel-converted, internal-queued, direct-communication channels, or fiber-extended channels, the corresponding FLA fields contain valid information; otherwise, the contents of the FLA fields are ignored.

(o) Maximum Managed Channel Paths (MMCP) 528: When the dynamic CHPID management facility is provided by the CPC, this field includes an unsigned binary integer that is a count of the maximum number of managed channel paths to which the specified control unit can be attached.

(p) Channel Path Identifier(s) (CHPID) 530: This field includes up to eight channel path identifiers. Each CHPID field that is specified as being valid by the contents of the CHPIDV field contains a unique channel path identifier of a channel path that can be used to access the specified control unit. The effective CSSID specifies the channel subsystem image in which each valid channel path is located.

The order in which channel paths (other than preferred channel paths) are selected by the channel subsystem to access I/O devices that are attached to the specified control unit is model dependent.

When the CPC is operating in LPAR mode, for a given I/O configuration definition, the channel paths to which a control unit is attached are to be sharable, or all of the channel paths are not to be sharable.

(q) Full Link Address(es) (FLA) 532: This field includes up to eight full link addresses for the specified control unit. Each address corresponds, one-for-one, with the CHPID field that is in the same relative position in the command request block. The FLA fields have meaning when the control unit is attached to a type of channel path that uses an interface protocol that requires use of a link address, a logical address, or both.

A full link address is the information that is contained in the destination address field of frames that are received by the specified control unit, and in the source address field of frames that are sent by the specified control unit.

Each address includes, for instance, a link address that is established based upon the channel path type of the specified channel path and a logical address of the specified control unit on the specified channel path.

(r) Unit Addresses 534: This field describes the I/O device unit addresses that are recognized by the control unit. A unit address includes, for instance, an Entry Type (ET) that includes a code that specifies the contents of the unit address. For example, when the entry type is equal to 1, the unit address field defines a single unit address, included in the field, that is recognized by the control unit.

As a further example, when the entry type is equal to 2, the unit address defines a range of unit addresses that are recognized by the control unit. The unit address field includes a unit address, which determines the beginning of the range, and a count parameter of the unit address field specifies one less than the number of consecutive unit addresses that make up the range.

Managed Channel Path Specification Rules: The following rules apply when the requested I/O configuration change affects the managed path attributes of the specified control unit:

1. When the add operation is specified in the OC field and a non-zero MMCP value is specified:
   a. The specified MMCP value is to be seven or less.
   b. The number of bits that are one in the CHPIDV field which designate managed channel paths is to be equal to, or less than, the specified MMCP value.
   c. The sum of the number of bits that are one in the CHPIDV field which designate non-managed channel paths and the specified MMCP value is to be eight or less.
   d. When the CPC is operating in LPAR mode, every channel path designated by a bit that is one in the CHPIDV field is to be a shared channel path.
   e. Every channel path designated by a bit that is one in the CHPIDV field is to be one of the types that are allowed for the specified control unit when it is attached to managed channel paths.
2. When the modify operation is specified in the OC field, the modify MMCP operation is specified in the OCQ field, and the specified MMCP value is the same as the MMCP value that is currently in effect for the specified control unit, no operations are performed regarding managed channel paths and the command completes normally.
3. When the modify operation is specified in the OC field, the modify MMCP operation is specified in the OCQ field, and the specified MMCP value is different from the MMCP value that is currently in effect for the specified control unit:
   a. The specified MMCP value is to be seven or less.
   b. The sum of the number of non-managed channel paths currently configured to the specified control unit and the specified MMCP value is to be eight or less.
   c. When the CPC is operating in LPAR mode, every channel path that is currently configured to the specified control unit is to be a shared channel path. (This rule is enforced, when the MMCP value that is in effect for the specified control unit would change from zero to non-zero as a result of executing the command.)
   d. Every channel path currently configured to the specified control unit is to be one of the types that are allowed for the specified control unit when it is attached to managed channel paths. (This rule is enforced, when the MMCP value that is in effect for the specified control unit would change from zero to non-zero as a result of executing the command.)
   e. The sum of the number of non-managed channel paths currently configured to all of the control units of a shared device cluster that includes the specified control unit, and the MMCP values that are in effect for all of those control units except the specified control unit, and the specified MMCP value is to be eight or less.
   f. Every channel path currently configured to the control units of a shared device cluster that contains the specified control unit is to be one of the types that are allowed for the specified control unit when it is attached to managed channel paths. (This rule is enforced, when the sum of the MMCP values that are in effect for the control units of the shared device cluster would change from zero to non-zero as a result of executing the command.)
4. When the modify operation is specified in the OC field, the add channel path access operation is specified in the OCQ field, and an MMCP value is in effect for either the specified control unit or one or more of the other control units of a shared device cluster that contains the specified control unit:
   a. The sum of the number of non-managed channel paths that are currently configured to the specified control unit, and the number of bits that are one in the CHPIDV field which designate non-managed channel paths, and the MMCP value that is in effect for the specified control unit is to be eight or less.
   b. The sum of the number of non-managed channel paths that are currently configured to all of the control units of a shared device cluster that includes the specified control unit, and the number of bits that are one in the CHPIDV field which designate non-managed channel paths, and the sum of all of the MMCP values that are in effect for all of the control units of the shared device cluster is to be eight or less.
   c. Every channel path designated by a bit that is one in the CHPIDV field is to be one of the types that are allowed for the specified control unit when it is attached to managed channel paths.

Figure 5B:
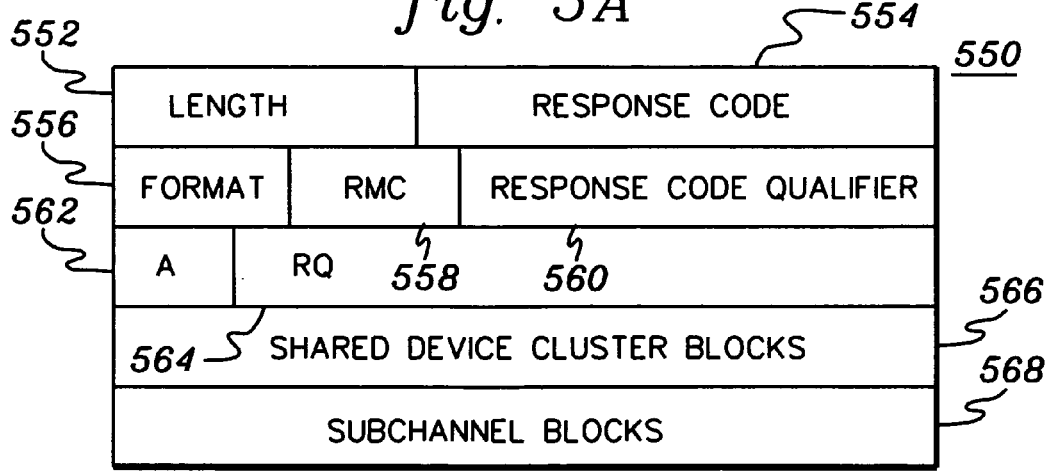
FIG. 5b depicts one embodiment of a response block for the Change Control Unit Configuration command, in accordance with an aspect of the present invention.

In one embodiment, a command response block 550 (FIG. 5b) for a Change Control Unit Configuration command includes, for instance, the following:

(a) Length Field 552: This field specifies the length of the command response block. The length depends on the response code that is stored in the response code field as a result of the attempt to execute the change control unit configuration command.

(b) Response Code 554: This field includes an unsigned binary integer that describes the results of the attempt to execute the change control unit configuration command.

(c) Format (FMT) 556: The command response format field includes an unsigned integer whose value specifies the layout of the command response block.

(d) Response Modifier Code (RMC) 558: This field includes an unsigned integer that may provide additional information when the response code is other than an indication of success. The content of the RMC field is distinctive to each response code value. Not all response codes use the RMC field.

(e) Response Code Qualifier (RCQ) 560: This field may contain a model dependent value that can be used to further describe the condition specified by the response code.

(f) Additional Information (A) 562: When one, this field specifies that the channel subsystem has additional subchannel blocks that cannot be contained in this command response block. When zero, it specifies that the channel subsystem has no subchannel blocks in addition to those, if any, that are contained in this command response block.

(g) Response Qualifier (RQ) 564: When the response code field indicates that the requested configuration change has occurred, the response qualifier field contains a value that provides information about conditions associated with that change. The meaning of each value is, for instance, as follows:

0 There are no special conditions associated with the configuration change.
  1 The information provided by the program for the configuration change does not match the physical configuration.

(h) Shared Device Cluster (SDC) Blocks 566: This field includes one or more shared device cluster (SDC) blocks. Each SDC block that is specified as being valid describes a shared device cluster that contains one or more I/O devices that are described as being attached to the control unit specified in the command request block of the change control unit configuration command that caused the SDC block to be created.

A shared device cluster is either a single control unit that can provide access to at least one I/O device, but does not share access to I/O devices with any other control unit, or it can be a collection of control units and I/O devices that are connected in such a way that for any division of the total collection of control units into two subsets, at least one I/O device is shared by at least one control unit from each subset.

Figure 5C:
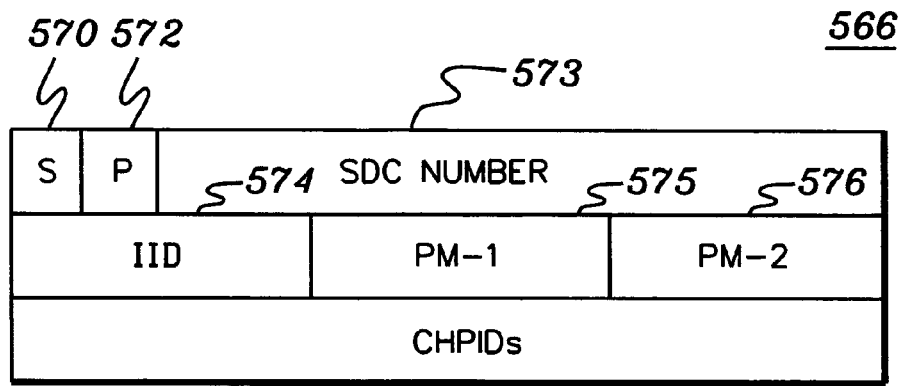
FIG. 5c depicts one embodiment of a shared device cluster block of the response block of FIG. 5b, in accordance with an aspect of the present invention.

One example of an SDC block is described with reference to FIG. 5c. An SDC block 566 includes, for instance, the following:

(aa) SDC Validity Bit (S) 570: When one, this bit specifies that the associated SDC block is valid. When zero, this bit specifies that the associated SDC block is not valid and there are no subsequent SDC blocks in the command response block that are valid.
  (bb) Image ID Validity Bit (P) 572: When one, this bit specifies that the image ID field contains a valid MIF image identification code. When zero, this bit specifies that the contents of the image ID field are meaningless.

The P bit can be one, when the CPC is operating in LPAR mode. When the SDC is associated with shared channel paths, this bit is set to zero.

(cc) Shared Device Cluster (SDC) Number 573: This field includes an SDC number that identifies the shared device cluster described by this SDC block. Within a channel subsystem image, every SDC has unique number.
  (dd) MIF Image ID (IID) 574: When the CPC is operating in LPAR mode and the P bit is one, this field includes the MIF image identification (IID) code associated with the logical partition from which the specified SDC is recognized. The SDC blocks returned are from the same channel subsystem image that was specified in the corresponding command request.
  (ee) Path Mask-1 (PM-1) 575: This field specifies the CHPID fields that identify the channel paths that are described in the I/O configuration definition for the specified SDC. Each bit of the PM-1 field corresponds one-for-one, by relative position, with each of the CHPID fields. A PM-1 bit stored as one specifies that the contents of the corresponding CHPID field identifies a channel path for the specified SDC. A PM-1 bit stored as zero specifies that the contents of the corresponding CHPID field have no meaning.
  (ff) Path Mask-2 (PM-2) 576: When the CPC is operating in LPAR mode, this field specifies the CHPID fields that identify the channel paths that are configured to the specified logical partition for the specified SDC. Each bit of the PM-2 field corresponds one-for-one, by relative position, with each of the CHPID fields. A PM-2 bit stored as one specifies that the contents of the corresponding CHPID field identifies a channel path for the specified SDC and the specified logical partition. A PM-2 bit stored as zero specifies that the contents of the corresponding CHPID field have no meaning.

A PM-2 bit can be one, if the corresponding bit of the PM-1 field is one. When the CPC is operating in LPAR mode and the specified channel paths are shared channel paths, the contents of the PM-2 field have no meaning. When the CPC is operating in basic mode, the contents of PM-2 field have no meaning.

(gg) Channel Path Identifiers (CHPIDs) 578: This field includes, for instance, eight CHPID fields. The CHPID fields that correspond to the bits of the PM-1 field that are ones contain the CHPIDs of channel paths for the specified SDC. The contents of CHPID fields that correspond to the bits of the PM-1 field that are zero are meaningless.

(i) Subchannel Blocks 568 (FIG. 5b): When the length field contains a value greater than a predetermined value (e.g., 0090 hex), this field includes one or more subchannel blocks. Each subchannel block describes a subchannel that is affected by the requested change to the I/O configuration.

Figure 5D:
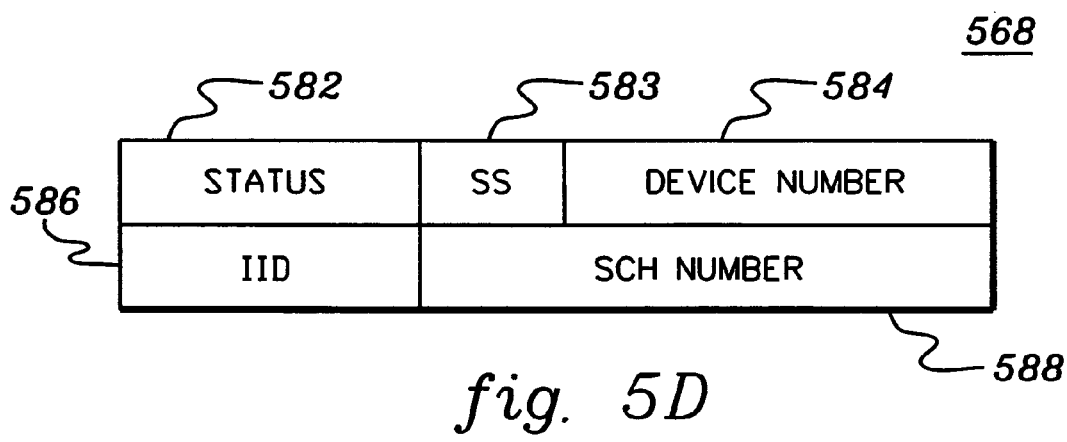
FIG. 5d depicts one embodiment of a subchannel block of the response block of FIG. 5b, in accordance with an aspect of the present invention.

One example of a subchannel block is described with reference to FIG. 5d. A subchannel block 568 includes, for instance:

(aa) Status 582: This field includes information about the status of the corresponding I/O device. The meanings of bits 0-7 are, for instance, as follows:

| Bits | Meaning |
| --- | --- |
| 0 | When one, bit 0 specifies that the installed parameters for the specified subchannel have been set to the initialized |

| Bits | Meaning |
|---|---|
| | state. When zero, bit 0 specifies that the installed parameters for the specified subchannel have been modified, but they are not set to the initialized state. |
| 1 | When one, bit 1 specifies that the IID field contains a valid MIF image identification code. When zero, bit 1 specifies that the contents of the Image ID field are meaningless. This bit can be one, when the CPC is operating in LPAR mode. |
| 2 | When the OC field of the command request block of the change control unit configuration command that caused this subchannel block to be created specifies the modify (delete channel path access) operation, bit 2 specifies whether a dedicated allegiance condition existed or whether the channel subsystem was in the process of accepting status that contains unit check, when the modify (delete channel path access) operation was performed for the specified I/O device. When zero, bit 2 specifies that a dedicated allegiance condition did not exist. When one, bit 2 specifies that a dedicated allegiance condition did exist, and bit 3 of the status field specifies whether the channel subsystem was able to clear the associated contingent allegiance condition at the device.<br>When the OC field of the command request block of the change control unit configuration command that caused this subchannel block to be created does not specify the modify (delete channel path access) operation, bit 2 has no meaning. |
| 3 | When bit 2 of the status field has meaning and is one, bit 3 specifies whether the channel subsystem was able to clear the contingent allegiance condition at the specified I/O device. When zero, bit 3 specifies that the channel subsystem was able to clear the contingent allegiance condition (which could result in zero sense data). When one, bit 3 specifies that the channel subsystem was unable to clear the contingent allegiance condition.<br>When bit 2 of the status field has no meaning or has meaning and is zero, bit 3 has no meaning. |
| 4 | When the OC field of the command request block of the change control unit configuration command that caused this subchannel block to be created specifies the modify (delete channel path access) operation, bit 4 specifies whether an I/O operation was in progress when the modify (delete channel path access) operation was performed for the specified I/O device. When zero, bit 4 specifies that an I/O operation was not in progress. When one, bit 4 specifies that an I/O operation was in progress, and bit 5 of the status field specifies whether the channel subsystem was able to terminate the I/O operation at the specified I/O device.<br>When the OC field of the command request block of the change control unit configuration command that caused this subchannel block to be created does not specify the modify (delete channel path access) operation, bit 4 has no meaning. |
| 5 | When bit 4 of the status field has meaning and is one, bit 5 specifies whether the channel subsystem was able to terminate the I/O operation at the specified I/O device. When zero, bit 5 specifies that the channel subsystem was able to terminate the I/O operation at the I/O device. When one, bit 5 specifies that the channel subsystem was unable to terminate the I/O operation at the I/O device.<br>When bit 4 of the status field has no meaning or has meaning and is zero, bit 5 has no meaning. |
| 6 | When the OC field of the command request block of the change control unit configuration command that caused this subchannel block to be created specifies the modify (delete channel path access) operation, bit 6 specifies whether the enabled bit (of the PMCW) was one or zero for the specified subchannel, when the channel subsystem started to perform the requested operation. When zero, bit 6 specifies that the enabled bit was zero. When one, bit 6 specifies that the enabled bit was one.<br>When the OC field of the command request block of the change control unit configuration command that caused this subchannel block to be created does not specify the modify (delete channel path access) operation, bit 6 has no meaning. |
| 7 | When the OC field of the command request block for the change control unit configuration command that caused this subchannel block to be created specifies the modify (delete channel path access) operation and the CPC is operating in LPAR mode, bit 7 specifies whether the interruption interlock control bit (of the PMCW) was one or more for the specified subchannel, when the channel subsystem started to perform the requested operation. When zero, bit 7 specifies that the interruption interlock bit was zero. When one, bit 7 specifies that the interruption interlock bit was one.<br>When the OC field of the command request block of the change control unit configuration command that caused this subchannel block to be created does not specify the modify (delete channel path access) operation, bit 7 has no meaning. |

(bb) Subchannel Set ID 583: This field includes a value (e.g., 2-bit unsigned integer) that specifies a subchannel set Id. In one example, the ID is in the range of 0-3.

(cc) Device Number 584: This field includes a binary representation of the device number for the I/O device that is associated with the specified subchannel.

(dd) MIF Image ID (IID) 586: When the CPC is operating in LPAR mode and bit 1 of the status field is one, this field includes the MIF image identification (IID) code associated with the logical partition with which the specified subchannel is associated. Otherwise, the contents of the IID field have no meaning.

(ee) Subchannel Number 588: This field specifies the subchannel to which the information in this subchannel block applies.

In one example, the following statements apply, when the CPC is operating in LPAR mode, SIE is not active, and the logical partition hypervisor causes the change control unit configuration command to be executed:

When the Multiple Channel Subsystem facility is provided by the CPC, the effective-CSSID determination process is performed.

The channel subsystem performs the requested configuration change for the control unit specified in the logical partition hypervisor request block.

When the command is executed asynchronously, the channel subsystem uses the CHSC subchannel specified by the subsystem ID word of the logical partition hypervisor request block.

If the IID in the subsystem ID word of the logical partition hypervisor request block does not exist for the current configuration, the requested configuration change is not performed and an operand exception condition is recognized.

When an IID is to be stored, the channel subsystem stores it in the MIF image ID field of the appropriate SDC or subchannel block contained in the logical partition hypervisor response block. This IID identifies the MIF image with which an SDC or subchannel is associated. The CSSID specified in the LPAR hypervisor command request block together with the IID corresponds to the logical partition on whose behalf the LPAR hypervisor executed the command request.

In addition to the above commands, commands are used to provide information regarding subchannels and subchannel sets. In such cases, the subchannel set identifier is provided in the request block to indicate for which subchannel set information is to be obtained.

For instance, a Store Configuration Information command is used to obtain configuration information from a specified channel subsystem image. In a request block for this command, a subchannel set identifier is provided which specifies the subchannel set id within which a count of remaining subchannel elements is requested. The requested information is returned in a parameter of a response block for the command.

Similarly, other store commands provide information for requested subchannel set identifiers, such as a Store Event Information command used to store event information that has been made pending by the channel subsystem; a Store I/O Device Address Information command used to obtain the subchannel number, unit address and device number for each I/O device that is described in the I/O configuration definition; a Store Path Status command used to obtain the current or last known status of each channel path configured to a particular subchannel or for a particular channel path; a Store Subchannel Description command used to obtain link addresses that are assigned to the control unit link level facilities associated with a specified range of subchannels; and a Store Subchannel Path Information command used to obtain the current or last known status of paths for a particular subchannel.

A channel subsystem determines the appropriate subchannel images by using the IID, CSSID, subchannel set identifier and subchannel number. The subchannel set identifier is used to identify the set that includes the specified subchannel. A default value is zero.

Described in detail above is a facility to enhance I/O connectivity by increasing the number of subchannel images available to a given operating system image. A plurality of sets of subchannel images is available to an operating system image. A subchannel set identifier is used to specify in which subchannel set the targeted subchannel is located. The number of subchannel sets available is dependent on the size of the subchannel set identifier. For example, if a two bit value is used, then four subchannel sets are available. Likewise, if a four bit value is used, then 16 subchannel sets may be defined. Other values are also possible.

Advantageously, I/O connectivity is increased by enabling operating system images to access additional subchannels without requiring a change to the size of the subchannel identifier or device identifier. This provides backward compatibility.

Moreover, backward compatibility to operating systems and other software is provided by having a default subchannel set (e.g., a set having a subchannel set identifier of zero). This enables software that is not aware of the MSS facility, and therefore, does not express a subchannel set identifier to continue processing. The MSS facility is transparent to those operating systems not taking advantage of MSS. To take advantage of MSS, an operating system enables the Multiple Subchannel Set facility by using a command. By enabling the facility, a subchannel set that is not the default subchannel set may be specified in an I/O instruction (e.g., in the subsystem identifier (SID) of general register 1).

Further, advantageously, a component, such as an I/O device, may be mapped to multiple subchannels within a given operating system image. Thus, the device can be accessed in parallel by one or more programs operating in parallel. For example, assume there is a subchannel in Subchannel Set ID 3 and a subchannel in Subchannel Set ID 2 that both map to Device X. Program A accesses Device X through the subchannel in Subchannel Set ID 3, while Program B accesses the same Device X through the subchannel in Subchannel Set ID 2.

Advantageously, the Multiple Subchannel Set facility enables an operating system to use more devices than are provided with a single subchannel set. Scalability or the total number of devices that can be addressed by a single operating system is increased.

Although various embodiments are described above, these are only examples. Additions, deletions and/or modifications to the above embodiments may be made, without departing from the spirit of aspects of the present invention. For instance, although a communications environment is described above, many different communications environments may be used. For example, more or less logical partitions (or other zones) may be included in the environment. Further, one or more partitions can be running in different architecture modes. Further, there may be multiple central processing complexes coupled together. These are just some of the variations that can be made without departing from the spirit from the present invention. Other variations are possible. For example, a communications environment that includes a plurality of multiple channel subsystems, one or more of which include multiple images, may be provided. Also, the communications environment need not be based on the z/Architecture.

Although in the above embodiment a multiple channel subsystem facility and a multiple image facility are described, one or more aspects of the present invention can be used in an environment that does not include one or both of those facilities. That is, a multiple subchannel set facility can be used by environments that do not include the multiple channel subsystem facility and/or the multiple image facility. The multiple subchannel set facility can be used by operating system images that wish to obtain access to additional subchannels. Further, although a specific number of subchannels is described herein, other numbers of subchannels may be used. Further, more or less than a number of subchannel sets described herein may also be used. Many other variations are possible without departing from the spirit of the present invention.

Additionally, subadapters other than subchannels and components other than devices may be employed.

Moreover, an environment may include an emulator (e.g., software or other emulation mechanisms), in which a particular architecture or subset thereof, is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

Yet further, even though in the above embodiments, a channel path includes a control unit, this is not necessary. A channel path may not connect to a control unit or a device, such as with Ethernet channel paths or channel to channel adapters, as examples. These types of channel paths, as well as others are within the spirit of one or more aspects of the present invention.

As yet another example, although an LPAR hypervisor is given as an example, other hypervisors, such as a virtual machine hypervisor, as well as others, may be used.

Additionally, although the commands described herein have various fields, more, less or different fields may be provided. Further, the positions of the fields in the figures do not necessarily indicate the position within a control block. Other positions may be available. Similarly, although in some contexts, specific bytes or bits are described, these are only examples. Other bytes or bits may be used. Further, other sizes may be provided.

As another example, although different configuration statements are provided with various parameters, the parameters and/or statements may be different and/or others may be added or deleted.

Likewise, in a further example, even though data structures of the IOCDS are described, there may be more, different or less structures and information within the structures can vary.

The above are only some examples of the enhancements/modifications that can be made. Others are possible without departing from the spirit of one or more aspects of the present invention.

The present invention can be included in an article of manufacture (e.g., one or more computer program products) having, for instance, computer usable media. The media has embodied therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of enhancing input/output (I/O) connectivity of a communications environment, said method comprising:
providing a plurality of sets of I/O communications subadapters to an operating system image of the communications environment, said plurality of sets of I/O communications subadapters providing information to the operating system image relating to a plurality of components associated with the plurality of sets of I/O communications subadapters, and wherein at least one set of I/O communications subadapters of the plurality of sets of I/O communications subadapters comprises a plurality of I/O communications subadapters; and
wherein the communications environment comprises a central processing complex having a plurality of logical partitions executing a plurality of operating system images, said central processing complex being coupled to a plurality of multiple image facility images, each multiple image facility image of one or more multiple image facility images of said plurality of multiple image facility images comprising a plurality of sets of I/O communications subadapters, and wherein the plurality of multiple image facility images are associated with one or more I/O subsystem images of an I/O subsystem coupled to the central processing complex, said I/O subsystem being configured as a plurality of I/O subsystem images, each I/O subsystem image appearing to the operating system as an independent and complete I/O subsystem.

2. The method of claim 1, wherein an I/O communications subadapter of one set of said plurality of sets of I/O communications subadapters is associated with a component of the plurality of components, and an I/O communications subadapter of another set of said plurality of sets of I/O communications subadapters is associated with the component.

3. The method of claim 2, wherein the component comprises an I/O device.

4. The method of claim 1, wherein the plurality of sets of I/O communications subadapters is transparent to an operating system image not exploiting the plurality of sets of I/O communications subadapters.

5. The method of claim 4, wherein a default set of I/O communications subadapters is used for the operating system image not exploiting the plurality of sets of I/O communications subadapters.

6. The method of claim 1, further comprising enabling use of the plurality of sets of I/O communications subadapters by the operating system image.

7. The method of claim 6, wherein the enabling use comprises setting an enable indicator by the operating system image via a command executed by the operating system image to enable use of sets of I/O communications subadapters.

8. The method of claim 1, wherein a set of I/O communications subadapters of the plurality of sets of I/O communications subadapters comprises a plurality of I/O communications subadapters and is represented by a subchannel set identifier.

9. The method of claim 1, further comprising changing a set of I/O communications subadapters of the plurality of sets of I/O communications subadapters, said changing comprising adding, deleting or revising a definition of an I/O communications subadapter in a configuration definition defining said set of I/O communications subadapters.

10. The method of claim 1, wherein a set of I/O communications subadapters of the plurality of sets I/O communications subadapters includes a different number of I/O communications subadapters than another set of I/O communication subadapters of the plurality of sets of I/O communications subadapters.

11. The method of claim 1, wherein a set of I/O communications subadapters of the plurality of sets I/O communications subadapters includes a same number of I/O communications subadapters as another set of I/O communication subadapters of the plurality of sets of I/O communications subadapters.

12. The method of claim 1, wherein the plurality of sets of I/O communications subadapters comprises a plurality of sets of subchannels and the plurality of components comprises a plurality of I/O devices.

13. A system of enhancing input/output (I/O) connectivity of a communications environment, said system comprising:
means for providing a plurality of sets of I/O communications subadapters to an operating system image of the communications environment, said plurality of sets of I/O communications subadapters providing information to the operating system image relating to a plurality of components associated with the plurality of sets of I/O communications subadapters, and wherein at least one set of I/O communications subadapters of the plurality of sets of I/O communications subadapters comprises a plurality of I/O communications subadapters; and wherein the communications environment comprises a central processing complex having a plurality of logical partitions executing a plurality of operating system images, said central processing complex being coupled to a plurality of multiple image facility images, each multiple image facility image of one or more multiple image facility images of said plurality of multiple image facility images comprising a plurality of sets of I/O communications subadapters, and wherein the plurality of multiple image facility images are associated with one or more I/O subsystem images of an I/O subsystem coupled to the central processing complex, said I/O subsystem being configured as a plurality of I/O subsystem images, each I/O subsystem image appearing to the operating system as an independent and complete I/O subsystem.

14. The system of claim 13, wherein an I/O communications subadapter of one set of said plurality of sets of I/O communications subadapters is associated with a component of the plurality of components, and an I/O communications subadapter of another set of said plurality of sets of I/O communications subadapters is associated with the component.

15. The system of claim 14, wherein the component comprises an I/O device.

16. The system of claim 13, wherein the plurality of sets of I/O communications subadapters is transparent to an operating system image not exploiting the plurality of sets of I/O communications subadapters.

17. The system of claim 16, wherein a default set of I/O communications subadapters is used for the operating system image not exploiting the plurality of sets of I/O communications subadapters.

18. The system of claim 13, further comprising means for enabling use of the plurality of sets of I/O communications subadapters by the operating system image.

19. The system of claim 18, wherein the means for enabling use comprises means for setting an enable indicator by the operating system image via a command executed by the operating system image to enable use of sets of I/O communications subadapters.

20. The system of claim 13, wherein a set of I/O communications subadapters of the plurality of sets of I/O communications subadapters comprises a plurality of I/O communications subadapters and is represented by a subchannel set identifier.

21. The system of claim 13, further comprising means for changing a set of I/O communications subadapters of the plurality of sets of I/O communications subadapters, said changing comprising adding, deleting or revising a definition of an I/O communications subadapter in a configuration definition defining said set of I/O communications subadapters.

22. The system of claim 13, wherein a set of I/O communications subadapters of the plurality of sets I/O communications subadapters includes a different number of I/O communications subadapters than another set of I/O communication subadapters of the plurality of sets of I/O communications subadapters.

23. The system of claim 13, wherein a set of I/O communications subadapters of the plurality of sets I/O communications subadapters includes a same number of I/O communications subadapters as another set of I/O communication subadapters of the plurality of sets of I/O communications subadapters.

24. The system of claim 13, wherein the plurality of sets of I/O communications subadapters comprises a plurality of sets of subchannels and the plurality of components comprises a plurality of I/O devices.

25. A system of enhancing input/output (I/O) connectivity of a communications environment, said system comprising:

a plurality of sets of I/O communication subadapters provided to an operating system image of the communications environment, said plurality of sets of I/O communications subadapters providing information to the operating system image relating to a plurality of components associated with the plurality of sets of I/O communications subadapters, and wherein at least one set of I/O communications subadapters of the plurality of sets of I/O communications subadapters comprises a plurality of I/O communications subadapters; and wherein the communications environment comprises a central processing complex having a plurality of logical partitions executing a plurality of operating system images, said central processing complex being coupled to a plurality of multiple image facility images, each multiple image facility image of one or more multiple image facility images of said plurality of multiple image facility images comprising a plurality of sets of I/O communications subadapters, and wherein the plurality of multiple image facility images are associated with one or more I/O subsystem images of an I/O subsystem coupled to the central processing complex, said I/O subsystem being configured as a plurality of I/O subsystem images, each I/O subsystem image appearing to the operating system as an independent and complete I/O subsystem.

26. An article of manufacture comprising:

at least one computer usable medium having computer readable program code logic to enhance input/output (I/O) connectivity of a communications environment, the computer readable program code logic comprising:

provide logic to provide a plurality of sets of I/O communications subadapters to an operating system image of the communications environment, said plurality of sets of I/O communications subadapters providing information to the operating system image relating to a plurality of components associated with the plurality of sets of I/O communications subadapters, and wherein at least one set of I/O communications subadapters of the plurality of sets of I/O communications subadapters comprises a plurality of I/O communications subadapters; and wherein the communications environment comprises a central processing complex having a plurality of logical partitions executing a plurality of operating system images, said central processing complex being coupled to a plurality of multiple image facility images, each multiple image facility image of one or more multiple image facility images of said plurality of multiple image facility images comprising a plurality of sets of I/O communications subadapters, and wherein the plurality of multiple image facility images are associated with one or more I/O subsystem images of an I/O subsystem coupled to the central processing complex, said I/O subsystem being configured as a plurality of I/O subsystem images, each I/O subsystem image appearing to the operating system as an independent and complete I/O subsystem.

27. The article of manufacture of claim 26, wherein an I/O communications subadapter of one set of said plurality of sets of I/O communications subadapters is associated with a component of the plurality of components, and an I/O communications subadapter of another set of said plurality of sets of I/O communications subadapters is associated with the component.

28. The article of manufacture of claim 27, wherein the component comprises an I/O device.

29. The article of manufacture of claim 26, wherein the plurality of sets of I/O communications subadapters is transparent to an operating system image not exploiting the plurality of sets of I/O communications subadapters.

30. The article of manufacture of claim 29, wherein a default set of I/O communications subadapters is used for the operating system image not exploiting the plurality of sets of I/O communications subadapters.

31. The article of manufacture of claim 26, further comprising enable logic to enable the use of the plurality of sets of I/O communications subadapters by the operating system image.

32. The article of manufacture of claim 31, wherein the enable logic comprises set logic to set an enable indicator by the operating system image via a command executed by the operating system image to enable use of sets of I/O communications subadapters.

33. The article of manufacture of claim 26, wherein a set of I/O communications subadapters of the plurality of sets of I/O communications subadapters comprises a plurality of I/O communications subadapters and is represented by a subchannel set identifier.

34. The article of manufacture of claim 26, further comprising change logic to change a set of I/O communications subadapters of the plurality of sets of I/O communications subadapters, the change logic comprising logic to add, delete or revise a definition of an I/O communications subadapter in a configuration definition defining said set of I/O communications subadapters.

35. The article of manufacture of claim 26, wherein a set of I/O communications subadapters of the plurality of sets I/O communications subadapters includes a different number of I/O communications subadapters than another set of I/O communication subadapters of the plurality of sets of I/O communications subadapters.

36. The article of manufacture of claim 26, wherein a set of I/O communications subadapters of the plurality of sets I/O communications subadapters includes a same number of I/O communications subadapters as another set of I/O communication subadapters of the plurality of sets of I/O communications subadapters.

37. The article of manufacture of claim 26, wherein the plurality of sets of I/O communications subadapters comprises a plurality of sets of subchannels, each set of subchannels having a subchannel set identifier to identify the set of subchannels as opposed to individual subchannels within the set, and the plurality of components comprises a plurality of I/O devices.

* * * * *